US011388004B2

(12) United States Patent
Faitelson et al.

(10) Patent No.: US 11,388,004 B2
(45) Date of Patent: Jul. 12, 2022

(54) SYSTEMS AND METHODS FOR PREVENTING EXCESS USER AUTHENTICATION TOKEN UTILIZATION CONDITIONS IN AN ENTERPRISE COMPUTER ENVIRONMENT

(71) Applicant: VARONIS SYSTEMS INC., New York, NY (US)

(72) Inventors: Yakov Faitelson, New York, NY (US); Ophir Kretzer-Katzir, Tenafly, NJ (US)

(73) Assignee: VARONIS SYSTEMS, INC., New York, NY (US)

(*) Notice: Subject to any disclaimer, the term of this patent is extended or adjusted under 35 U.S.C. 154(b) by 265 days.

(21) Appl. No.: 16/150,827

(22) Filed: Oct. 3, 2018

(65) Prior Publication Data

US 2019/0103969 A1    Apr. 4, 2019

Related U.S. Application Data

(60) Provisional application No. 62/567,314, filed on Oct. 3, 2017.

(51) Int. Cl.
*H04L 9/32* (2006.01)
*G06F 21/33* (2013.01)
(Continued)

(52) U.S. Cl.
CPC ........ *H04L 9/3213* (2013.01); *G06F 11/0793* (2013.01); *G06F 21/316* (2013.01);
(Continued)

(58) Field of Classification Search
CPC . H04L 29/06761; H04L 9/3213; H04L 63/08; G06F 21/335; G06F 21/33
See application file for complete search history.

(56) References Cited

U.S. PATENT DOCUMENTS 5,778,387 A * 7/1998 Wilkerson .......... G06F 11/1471
7,702,917 B2 * 4/2010 Tevosyan ............ H04L 63/0807
713/185

(Continued)

FOREIGN PATENT DOCUMENTS

| WO | 99/64948 | 12/1999 |
| WO | 2010/048046 | 4/2010 |
| WO | 2015/013745 | 2/2015 |

OTHER PUBLICATIONS

Josh Sprenger. Kerberos and Access Token Limitations. GIAC directory of certified professionals, Feburary 15, 2015 [retrieved on Aug. 20, 2020], <URL: https://web.archive.org/web/20150215022855/https://www.giac.org/paper/gsec/5111/kerberos-access-token-limitations/104962> (Year: 2015).*

(Continued)

*Primary Examiner* — Jeremy S Duffield
*Assistant Examiner* — Zhe Liu

(57) ABSTRACT

A system for preventing an excess user authentication token utilization condition in an enterprise computer environment, the system including an excess user authentication token utilization condition predictor operable for calculating a number of additional group memberships of each of the enterprise users that can be expected to result in an excess user authentication token utilization condition, a group membership estimator operable, for each the enterprise user, for estimating a number of additional group memberships of the enterprise user that will be created by an anticipated activity, and an anticipated excess user authentication token utilization condition alerter operable, before initiation of the anticipated activity, for providing an alert if the anticipated activity can be expected to result in an excess user authentication token utilization condition.

12 Claims, 21 Drawing Sheets

(51) Int. Cl.
G06F 11/07 (2006.01)
G06F 21/31 (2013.01)
G06F 21/45 (2013.01)

(52) U.S. Cl.
CPC ............ *G06F 21/33* (2013.01); *G06F 21/335* (2013.01); *G06F 21/45* (2013.01); *G06F 2221/2101* (2013.01); *G06F 2221/2117* (2013.01); *G06F 2221/2141* (2013.01)

(56) References Cited

U.S. PATENT DOCUMENTS

| | | | | |
|---|---|---|---|---|
| 8,290,900 | B2 * | 10/2012 | Burjoski | H04L 67/1095 707/610 |
| 8,429,708 | B1 * | 4/2013 | Tandon | H04L 63/08 726/1 |
| 8,490,152 | B2 * | 7/2013 | Staiman | G06Q 10/0631 726/1 |
| 9,584,515 | B2 * | 2/2017 | Hayton | H04L 63/0815 |
| 9,608,990 | B2 * | 3/2017 | Kobayashi | H04L 63/0807 |
| 10,223,541 | B2 * | 3/2019 | Balijepalli | G06F 21/6218 |
| 2001/0020228 | A1 | 9/2001 | Cantu et al. | |
| 2005/0086534 | A1 * | 4/2005 | Hindawi | H04L 63/1433 726/4 |
| 2008/0271157 | A1 * | 10/2008 | Faitelson | G06F 21/6218 726/27 |
| 2011/0296490 | A1 * | 12/2011 | Faitelson | G06Q 10/103 726/1 |
| 2012/0102489 | A1 * | 4/2012 | Staiman | G06Q 10/0631 718/1 |
| 2014/0082407 | A1 * | 3/2014 | Kochut | G06F 11/0766 714/2 |
| 2015/0280959 | A1 * | 10/2015 | Vincent | H04L 67/1097 709/203 |
| 2015/0341346 | A1 * | 11/2015 | Novak | H04L 63/102 726/9 |
| 2016/0150047 | A1 * | 5/2016 | O'Hare | G06F 3/0619 713/168 |
| 2018/0183724 | A1 * | 6/2018 | Callard | H04L 47/6295 |
| 2018/0213048 | A1 * | 7/2018 | Messner | H04L 51/24 |

OTHER PUBLICATIONS

Tim Springston. Check for MaxTokenSize Problems (Updated). Microsoft Script Center. Apr. 13, 2016 [retrieved on Aug. 18, 2020], < URL: https://gallery.technet.microsoft.com/scriptcenter/Check-for-MaxTokenSize-520e51e5> (Year: 2016).*

Tandon Sanjay. Kerberos Token Bloat—Details, Example, Token Size Calculation Tools and Security Implications. Active Directory Security Blog. May 27, 2014 [retrieved on Aug. 18, 2020], <URL: https://www.active-directory-security.com/2014/05/An-Automated-Kerberos-Token-Size-Calculation-Tool.html> (Year: 2014).*

Josh Sprenger, Kerberos and Access Token Limitations, GIAC directory of certified professionals [online], Feb. 15, 2015 [retrieved on Aug. 20, 2020], retrieved from the Internet<URL:https://web.archive.org/web/20150215022855/https://www.giac.org/paper/gsec/5111/kerberos-access-token-limitations> (Year: 2015).*

Active Directory Insights (Part 12)—MaxTokenSize [online], TechGenix, 2016 [retrieved on May 13, 2021], retrieved from the internet: <URL: https://techgenix.com/active-directory-insights-part12/> (Year: 2016).*

How to Remove SID History With PowerShell [online]; Microsoft Corporation 2011 [retrieved on May 13, 2021]; retrieved from the internet: <URL: https://docs.microsoft.com/en-us/archive/blogs/ashleymcglone/how-to-remove-sid-history-with-powershell> (Year: 2011).*

McPherson, Method of Implementing Group Intersection in an Access Control List; Prior Art Database; May 9, 2006 [retrieved on Mar. 7, 2022], retrieved from the internet: <URL: https://priorart.ip.com/IPCOM/000136223> (Year: 2006).*

Tandon Sanjayl, Kerberos Token Bloat—Details, Example, Token Size Calculation Tools and Security Implications, Active Directory Security Blog, May 27, 2014 [retrieved on Aug. 18, 2020], <URL: https://www.active-directory-security.com/2014/05/An-Automated-Kerberos-Token-Size-Calculation-Tool.html> (Year: 2014).*

U.S. Appl. No. 62/567,314, filed Oct. 3, 2017.

International Search Report and a Written Opinion both dated Dec. 14, 2018, which issued during the prosecution of Applicant's PCT/2018/051075.

* cited by examiner

SYSTEMS AND METHODS FOR PREVENTING EXCESS USER AUTHENTICATION TOKEN UTILIZATION CONDITIONS IN AN ENTERPRISE COMPUTER ENVIRONMENT

REFERENCE TO RELATED APPLICATIONS

Reference is made to U.S. Provisional Patent Application Ser. No. 62/567,314, filed Oct. 3, 2017 and entitled "SYSTEMS AND METHODS FOR PREVENTING EXCESS USER AUTHENTICATION TOKEN UTILIZATION CONDITIONS IN AN ENTERPRISE COMPUTER ENVIRONMENT", the disclosure of which is hereby incorporated by reference and priority of which is hereby claimed pursuant to 37 CFR 1.78(a) (4) and (5)(i).

Reference is also made to the following patents and patent applications, owned by assignee, the disclosures of which are hereby incorporated by reference:

U.S. Published Patent Application 2011/0296490.

FIELD OF THE INVENTION

The present invention relates to systems and methods for preventing excess user authentication token utilization conditions in an enterprise computer environment.

BACKGROUND OF THE INVENTION

As is well known in the art, every enterprise user of an enterprise computer domain managed by Microsoft® Active Directory® is assigned a user authentication token which contains information relating, inter alia, to the multiplicity of user groups of which the enterprise user is a member. The user authentication token is typically limited in size. Therefore, as a user is granted membership to additional user groups, the information stored in the token may exceed the capacity of the token. This condition, referred to as "token bloat", typically results is failure of the user to which the token is assigned to login to the enterprise network. The present invention provides methods and system for preventing token bloat.

SUMMARY OF THE INVENTION

The present invention provides systems and methods for preventing excess user authentication token utilization conditions in an enterprise computer environment.

There is thus provided in accordance with a preferred embodiment of the present invention a system for preventing an excess user authentication token utilization condition in an enterprise computer environment, the system including an excess user authentication token utilization condition predictor operable for calculating a number of additional group memberships of each of the enterprise users that can be expected to result in an excess user authentication token utilization condition, a group membership estimator operable, for each the enterprise user, for estimating a number of additional group memberships of the enterprise user that will be created by an anticipated activity, and an anticipated excess user authentication token utilization condition alerter operable, before initiation of the anticipated activity, for providing an alert if the anticipated activity can be expected to result in an excess user authentication token utilization condition.

Preferably, the system also includes an anticipated excess user authentication token utilization condition preventer operable for preventing execution of the anticipated activity if the anticipated activity can be expected to result in an excess user authentication token utilization condition.

There is also provided in accordance with another preferred embodiment of the present invention a system for preventing an excess user authentication token utilization condition in an enterprise computer environment, the system including an excess user authentication token utilization condition predictor operable for calculating a number of additional group memberships of each of the enterprise users that can be expected to result in an excess user authentication token utilization condition, a group membership estimator operable, for each the enterprise user, for estimating a number of additional group memberships of the enterprise user that will be created by an anticipated activity, and an anticipated excess user authentication token utilization condition preventer operable for preventing execution of the anticipated activity if the anticipated activity can be expected to result in an excess user authentication token utilization condition.

Preferably, the system also includes an excess user authentication token utilization condition predictor operable for calculating a number of additional group memberships of each of the enterprise users that can be expected to result in an excess user authentication token utilization condition, a group membership estimator operable, for each the enterprise user, for estimating a number of additional group memberships of the enterprise user that will be created by an anticipated activity, and an anticipated excess user authentication token utilization condition preventer operable, in a case where the anticipated activity can be expected to result in an excess user authentication token utilization condition, for modifying the anticipated activity so as to ensure that execution of the modified activity cannot be expected to result in an excess user authentication token utilization condition.

There is further provided in accordance with yet another preferred embodiment of the present invention a system for preventing an excess user authentication token utilization condition in an enterprise computer environment, the system including an excess user authentication token utilization condition predictor operable for calculating a number of additional group memberships of each of the enterprise users that can be expected to result in an excess user authentication token utilization condition, a group membership estimator operable for each the enterprise user for estimating a number of additional group memberships of the enterprise user that will be created by a first anticipated activity having a first scope and before initiation of the first anticipated activity of the first scope, for estimating a number of additional group memberships of the enterprise user that will be created by a further anticipated activity having a second scope different from and non-overlapping the first scope, and an anticipated excess user authentication token utilization condition alerter operable for providing an alert if the further anticipated activity can be expected to result in an excess user authentication token utilization condition, even if the first anticipated activity cannot be expected to result in an excess user authentication token utilization condition.

Preferably, the scope encompasses all network objects in the enterprise computer environment. Preferably, the system also includes an anticipated excess user authentication token utilization condition preventer operable for preventing execution of the first anticipated activity if the further anticipated activity can be expected to result in an excess user authentication token utilization condition, even if the first anticipated activity cannot be expected to result in an excess user authentication token utilization condition.

There is yet further provided in accordance with yet another preferred embodiment of the present invention a system for preventing an excess user authentication token utilization condition in an enterprise computer environment, the system including an excess user authentication token utilization condition predictor operable for calculating a number of additional group memberships of each of the enterprise users that can be expected to result in an excess user authentication token utilization condition, a group membership estimator operable, for each the enterprise user for estimating a number of additional group memberships of the enterprise user that will be created by a first anticipated activity having a first scope and, before initiation of the first anticipated activity of the first scope, for estimating a number of additional group memberships of the enterprise user that will be created by a further anticipated activity having a second scope different from and non-overlapping the first scope, and an anticipated excess user authentication token utilization condition preventer operable for preventing execution of the first anticipated activity if the further anticipated activity can be expected to result in an excess user authentication token utilization condition, even if the first anticipated activity cannot be expected to result in an excess user authentication token utilization condition.

There is yet further provided in accordance with yet another preferred embodiment of the present invention a system for preventing an excess user authentication token utilization condition in an enterprise computer environment, the system including an excess user authentication token utilization condition predictor operable for calculating a number of additional group memberships of each of the enterprise users that can be expected to result in an excess user authentication token utilization condition, a group membership estimator operable, for each the enterprise user, for estimating a number of additional group memberships of the enterprise user that will be created by a first anticipated activity having a first scope and, before initiation of the first anticipated activity of the first scope, for estimating a number of additional group memberships of the enterprise user that will be created by a further anticipated activity having a second scope different from and non-overlapping the first scope, and an anticipated excess user authentication token utilization condition preventer operable, in a case where the further anticipated activity can be expected to result in an excess user authentication token utilization condition, for modifying the first anticipated activity so as to ensure that the further anticipated activity cannot be expected to result in an excess user authentication token utilization condition, even if the first anticipated activity cannot be expected to result in an excess user authentication token utilization condition.

There is yet further provided in accordance with yet another preferred embodiment of the present invention a user authentication token size calculator including a user group ascertainer operable for ascertaining for each of a plurality of enterprise users, user groups of which the enterprise user is a member, a group identifier size ascertainer operable for ascertaining the size of a group identifier for each of the user groups of which the enterprise user is a member, and a user authentication token size calculator operable for summing the sizes of the group identifiers for each of the user groups of which the enterprise user is a member to arrive at a current user authentication token size for each the enterprise user.

Preferably, at least one of the user group ascertainer, the group identifier size ascertainer and the user authentication token size calculator is configured for intermittent operation. Additionally or alternatively, at least one of the user group ascertainer, the group identifier size ascertainer and the user authentication token size calculator is operable in response to group membership change events. Additionally or alternatively, at least one of the user group ascertainer, the group identifier size ascertainer and the user authentication token size calculator is configured for periodic operation. Additionally or alternatively, at least one of the user group ascertainer, the group identifier size ascertainer and the user authentication token size calculator is configured for pre-scheduled operation.

There is yet further provided in accordance with yet another preferred embodiment of the present invention an excess user authentication token utilization condition predictor including a user authentication token size calculator operable for calculating a current user authentication token size for each enterprise user in an enterprise computer environment, an available user authentication token size calculator operable for calculating a currently available user authentication token size for each of the enterprise users based on the current user authentication token size, an average group identifier size calculator operable for calculating an average group identifier size for multiple user groups in the enterprise computer environment, and an excess user authentication token utilization condition calculator operable, based on the available user authentication token size and the average group identifier size, for calculating a number of additional group memberships of each of the enterprise users that can be expected to result in an excess user authentication token utilization condition.

Preferably, the excess user authentication token utilization condition predictor also includes an alert provider operable for providing an alert with respect to each of the enterprise users before the user reaches an excess user authentication token utilization condition. Preferably, the excess user authentication token utilization condition predictor also includes a remediation process initiator operable for initiating a remediation process for each of the enterprise users before the user reaches an excess user authentication token utilization condition.

There is yet further provided in accordance with yet another preferred embodiment of the present invention an excess user authentication token utilization condition predictor including a user authentication token size calculator operable for calculating a current user authentication token size for each enterprise user in an enterprise computer environment, an available user authentication token size calculator operable for calculating a currently available user authentication token size for each of the enterprise users from the current user authentication token size based on the current user authentication token size, a maximum group identifier size calculator operable for calculating a maximum group identifier size for multiple user groups in the enterprise computer environment, and an excess user authentication token utilization condition calculator operable, based on the available user authentication token size and the maximum group identifier size, for calculating the number of additional group memberships of each of the enterprise users that can be expected to result in an excess user authentication token utilization condition.

Preferably, the excess user authentication token utilization condition predictor also includes an alert provider operable for providing an alert with respect to each of the enterprise users before the user reaches an excess user authentication token utilization condition. Preferably, the excess user authentication token utilization condition predictor also includes a remediation process initiator operable for initiating a remediation process for each of the enterprise users before the user reaches an excess user authentication token utilization condition.

There is yet further provided in accordance with yet another preferred embodiment of the present invention a remediation process initiator including at least one of the following a group membership redundancy eliminator operable for eliminating group membership redundancy of the enterprise user, a group membership reducer operable for at least one of replacing at least a plurality of existing group memberships with a lesser plurality of group memberships, replacing at least one existing group membership having a group identifier of a first size with at least one group membership having a group identifier of a second size, smaller than the first size, and removing at least one existing group membership from the enterprise user, based on a similarity between the enterprise user and at least one additional user, the similarity being based on a similarity of actual access of the enterprise user and the at least one additional user; and an access permissions modifier operable for changing access permissions within the enterprise computer environment in order to reduce the number of existing group memberships.

Preferably, at least one of the group membership redundancy eliminator, the group membership reducer and the access permissions modifier is configured for automatic operation. Additionally or alternatively, at least one of the group membership redundancy eliminator, the group membership reducer and the access permissions modifier is operable in response to a directive issued by an authorized user.

There is yet further provided in accordance with yet another preferred embodiment of the present invention a method for preventing an excess user authentication token utilization condition in an enterprise computer environment, the method including calculating a number of additional group memberships of each of the enterprise users that can be expected to result in an excess user authentication token utilization condition, for each the enterprise user, estimating a number of additional group memberships of the enterprise user that will be created by an anticipated activity, and before initiation of the anticipated activity, providing an alert if the anticipated activity can be expected to result in an excess user authentication token utilization condition.

Preferably, the method also includes preventing execution of the anticipated activity if the anticipated activity can be expected to result in an excess user authentication token utilization condition.

There is yet further provided in accordance with yet another preferred embodiment of the present invention a method for preventing an excess user authentication token utilization condition in an enterprise computer environment, the method including calculating a number of additional group memberships of each of the enterprise users that can be expected to result in an excess user authentication token utilization condition, for each the enterprise user, estimating a number of additional group memberships of the enterprise user that will be created by an anticipated activity, and preventing execution of the anticipated activity if the anticipated activity can be expected to result in an excess user authentication token utilization condition.

There is yet further provided in accordance with yet another preferred embodiment of the present invention a method for preventing an excess user authentication token utilization condition in an enterprise computer environment, the method including calculating a number of additional group memberships of each of the enterprise users that can be expected to result in an excess user authentication token utilization condition, for each the enterprise user, estimating a number of additional group memberships of the enterprise user that will be created by an anticipated activity and, if the anticipated activity can be expected to result in an excess user authentication token utilization condition, modifying the anticipated activity so as to ensure that execution of the modified activity cannot be expected to result in an excess user authentication token utilization condition.

There is yet further provided in accordance with yet another preferred embodiment of the present invention a method for preventing an excess user authentication token utilization condition in an enterprise computer environment, the method including calculating a number of additional group memberships of each of the enterprise users that can be expected to result in an excess user authentication token utilization condition, for each the enterprise user, estimating a number of additional group memberships of the enterprise user that will be created by a first anticipated activity having a first scope, before initiation of the first anticipated activity of the first scope, estimating a number of additional group memberships of the enterprise user that will be created by a further anticipated activity having a second scope different from and non-overlapping the first scope, and providing an alert if the further anticipated activity can be expected to result in an excess user authentication token utilization condition, even if the first anticipated activity cannot be expected to result in an excess user authentication token utilization condition.

Preferably, the scope encompasses all network objects in the enterprise computer environment.

Preferably, the method also includes preventing execution of the first anticipated activity if the further anticipated activity can be expected to result in an excess user authentication token utilization condition, even if the first anticipated activity cannot be expected to result in an excess user authentication token utilization condition.

There is yet further provided in accordance with yet another preferred embodiment of the present invention a method for preventing an excess user authentication token utilization condition in an enterprise computer environment, the method including calculating a number of additional group memberships of each of the enterprise users that can be expected to result in an excess user authentication token utilization condition, for each the enterprise user, estimating a number of additional group memberships of the enterprise user that will be created by a first anticipated activity having a first scope, before initiation of the first anticipated activity of the first scope, estimating a number of additional group memberships of the enterprise user that will be created by a further anticipated activity having a second scope different from and non-overlapping the first scope, and preventing execution of the first anticipated activity if the further anticipated activity can be expected to result in an excess user authentication token utilization condition, even if the first anticipated activity cannot be expected to result in an excess user authentication token utilization condition.

There is yet further provided in accordance with yet another preferred embodiment of the present invention a method for preventing an excess user authentication token utilization condition in an enterprise computer environment, the method including calculating a number of additional group memberships of each of the enterprise users that can be expected to result in an excess user authentication token utilization condition, for each the enterprise user, estimating a number of additional group memberships of the enterprise user that will be created by a first anticipated activity having a first scope, before initiation of the first anticipated activity of the first scope, estimating a number of additional group memberships of the enterprise user that will be created by a further anticipated activity having a second scope different from and non-overlapping the first scope, and if the further anticipated activity can be expected to result in an excess user authentication token utilization condition, modifying the first anticipated activity so as to ensure that the further anticipated activity cannot be expected to result in an excess user authentication token utilization condition, even if the first anticipated activity cannot be expected to result in an excess user authentication token utilization condition.

There is yet further provided in accordance with yet another preferred embodiment of the present invention a method for calculating current user authentication token size for enterprise users in an enterprise computer environment, the method including ascertaining for each of a plurality of enterprise users, user groups of which the enterprise user is a member, ascertaining the size of a group identifier for each of the user groups of which the enterprise user is a member, and summing the sizes of the group identifiers for each of the user groups of which the enterprise user is a member to arrive at a current user authentication token size for each the enterprise user.

Preferably, at least one of the ascertaining for each of a plurality of enterprise users, user groups of which the enterprise user is a member, ascertaining the size of a group identifier for each of the user groups of which the enterprise user is a member and summing the sizes of the group identifiers for each of the user groups of which the enterprise user is a member to arrive at a current user authentication token size for each the enterprise user is carried out intermittently. Additionally or alternatively, at least one of the ascertaining for each of a plurality of enterprise users, user groups of which the enterprise user is a member, ascertaining the size of a group identifier for each of the user groups of which the enterprise user is a member, and summing the sizes of the group identifiers for each of the user groups of which the enterprise user is a member to arrive at a current user authentication token size for each the enterprise user is carried out in response to group membership change events. Additionally or alternatively, at least one of the ascertaining for each of a plurality of enterprise users, user groups of which the enterprise user is a member, ascertaining the size of a group identifier for each of the user groups of which the enterprise user is a member, and summing the sizes of the group identifiers for each of the user groups of which the enterprise user is a member to arrive at a current user authentication token size for each the enterprise user is carried out periodically. Additionally or alternatively, at least one of the ascertaining for each of a plurality of enterprise users, user groups of which the enterprise user is a member, ascertaining the size of a group identifier for each of the user groups of which the enterprise user is a member, and summing the sizes of the group identifiers for each of the user groups of which the enterprise user is a member to arrive at a current user authentication token size for each the enterprise user is carried out on a pre-scheduled basis.

There is yet further provided in accordance with yet another preferred embodiment of the present invention a method for ascertaining whether an excess user authentication token utilization condition is imminent in an enterprise computer environment, the method including calculating a current user authentication token size for each enterprise user in an enterprise computer environment, calculating a currently available user authentication token size for each of the enterprise users based on the current user authentication token size, calculating an average group identifier size for multiple user groups in the enterprise computer environment, and based on the available user authentication token size and the average group identifier size, calculating a number of additional group memberships of each of the enterprise users that can be expected to result in an excess user authentication token utilization condition.

Preferably, the method also includes providing an alert with respect to each of the enterprise users before the user reaches an excess user authentication token utilization condition. Preferably, the method also includes automatically initiating a remediation process for each of the enterprise users before the user reaches an excess user authentication token utilization condition.

There is yet further provided in accordance with yet another preferred embodiment of the present invention a method for ascertaining whether an excess user authentication token utilization condition is imminent in an enterprise computer environment, the method including calculating a current user authentication token size for each enterprise user in an enterprise computer environment, calculating a currently available user authentication token size for each of the enterprise users from the current user authentication token size based on the current user authentication token size, calculating a maximum group identifier size for multiple user groups in the enterprise computer environment, and based on the available user authentication token size and the maximum group identifier size, calculating the number of additional group memberships of each of the enterprise users that can be expected to result in an excess user authentication token utilization condition.

Preferably, the method also includes providing an alert with respect to each of the enterprise users before the user reaches an excess user authentication token utilization condition. Preferably, the method also includes automatically initiating a remediation process for each of the enterprise users before the user reaches an excess user authentication token utilization condition.

There is yet further provided in accordance with yet another preferred embodiment of the present invention a method for remediating the size of a user authentication token of an enterprise user in an enterprise computer environment, the method including at least one of the following eliminating group membership redundancy of the enterprise user, replacing at least a plurality of existing group memberships with a lesser plurality of group memberships, replacing at least one existing group membership having a group identifier of a first size with at least one group membership having a group identifier of a second size, smaller than the first size, removing at least one existing group membership from the enterprise user, based on a similarity between the enterprise user and at least one additional user, the similarity being based on a similarity of actual access of the enterprise user and the at least one additional user, and changing access permissions within the enterprise computer environment in order to reduce the number of existing group memberships.

Preferably, at least one of the eliminating group membership redundancy of the enterprise user, replacing at least a plurality of existing group memberships with a lesser plurality of group memberships, replacing at least one existing group membership having a group identifier of a first size with at least one group membership having a group identifier of a second size, smaller than the first size, removing at least one existing group membership from the enterprise user, based on a similarity between the enterprise user and at least one additional user, the similarity being based on a similarity of actual access of the enterprise user and the at least one additional user, and changing access permissions within the enterprise computer environment in order to reduce the number of existing group memberships is carried out automatically. Additionally or alternatively, at least one of the eliminating group membership redundancy of the enterprise user, replacing at least a plurality of existing group memberships with a lesser plurality of group memberships, replacing at least one existing group membership having a group identifier of a first size with at least one group membership having a group identifier of a second size, smaller than the first size, removing at least one existing group membership from the enterprise user, based on a similarity between the enterprise user and at least one additional user, the similarity being based on a similarity of actual access of the enterprise user and the at least one additional user, and changing access permissions within the enterprise computer environment in order to reduce the number of existing group memberships is carried out in response to a directive issued by an authorized user.

BRIEF DESCRIPTION OF THE DRAWINGS

The present invention will be understood and appreciated more fully from the following detailed description in which.

DETAILED DESCRIPTION OF PREFERRED EMBODIMENTS

Reference is now made to FIGS. 1A-1D are simplified pictorial illustrations which together illustrate steps in the execution of a method for preventing an excess user authentication token utilization condition in an enterprise computer environment, operative in accordance with a preferred embodiment of the present invention.

The method of FIGS. 1A-1D preferably includes:

calculating a number of additional group memberships of each enterprise user that can be expected to result in an excess user authentication token utilization condition;

for each enterprise user, estimating a number of additional group memberships of the enterprise user that will be created by an anticipated activity; and before initiation of the anticipated activity, providing an alert if the anticipated activity can be expected to result in an excess user authentication token utilization condition.

It is appreciated that additionally or alternatively, the method may include preventing execution of the anticipated activity if the anticipated activity can be expected to result in an excess user authentication token utilization condition.

It is further appreciated that additionally or alternatively, if the anticipated activity can be expected to result in an excess user authentication token utilization condition, the method may include modifying the anticipated activity so as to ensure that execution of the modified activity cannot be expected to result in an excess user authentication token utilization condition.

Figure 1A:
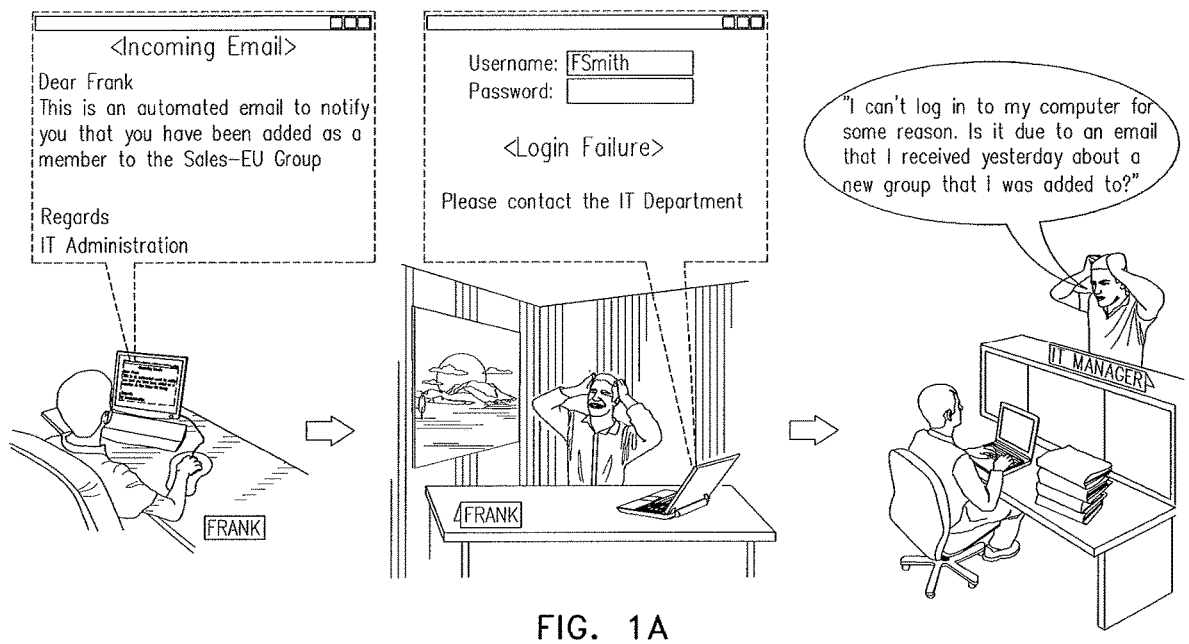
FIGS. 1A-1D are simplified pictorial illustrations which together illustrate steps in the operation of a system and methods for preventing an excess user authentication token utilization condition in an enterprise computer environment, operative in accordance with a preferred embodiment of the present invention.
Figure 1B:
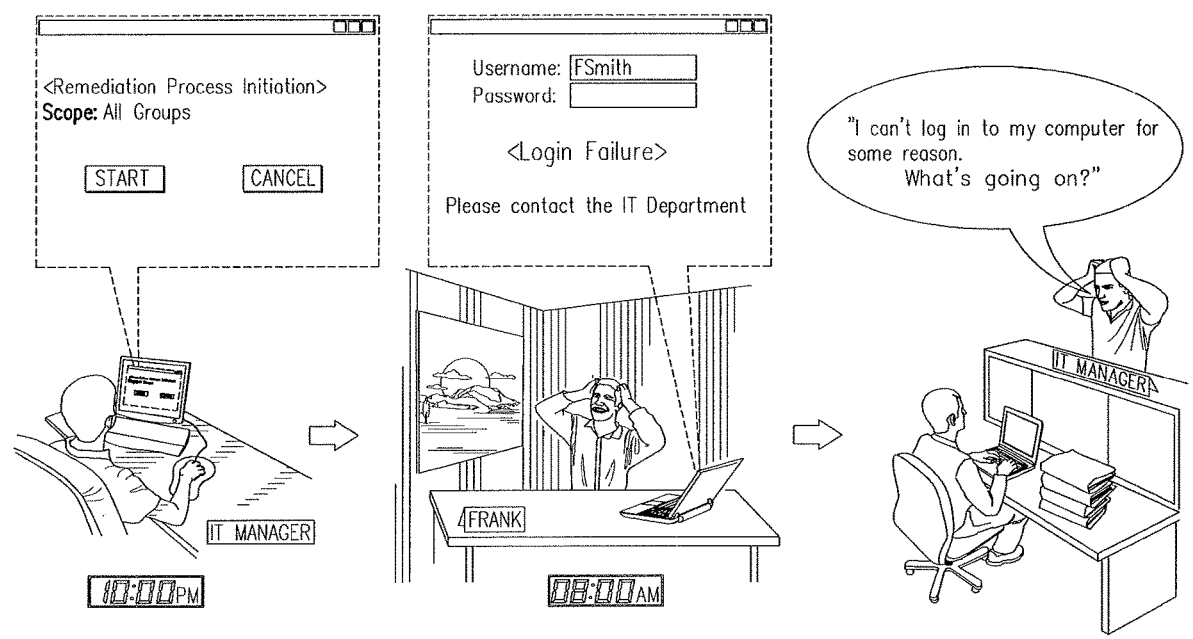

FIGS. 1A & 1B illustrate examples of an enterprise user experiencing a condition of token bloat. As described hereinabove, every enterprise user of an enterprise computer domain managed by Microsoft® Active Directory® is preferably assigned a user authentication token which contains information relating, inter alia, to the multiplicity of user groups of which the enterprise user is a member. The user authentication token is typically limited in size. Therefore, as a user is granted membership to additional user groups, the information stored in the token may exceed the capacity of the token. This condition, which for the purpose of the present application is referred to as "token bloat", typically results in failure of the user to which the token is assigned to login to the enterprise network.

Turning first to FIG. 1A, it is shown that Frank, an enterprise network user, receives a notification, such as from an IT Administrator of the enterprise network, that he has been granted group membership to a new enterprise user group, namely the Sales-EU group. Shorty thereafter, Frank attempts to login to the enterprise network, however is refused access to the enterprise network, and reports the issue to the IT Administrator.

FIG. 1B illustrates an alternative example of an enterprise network user experiencing a condition of token bloat. As shown in FIG. 1B, an IT Administrator of the enterprise network executes a group membership remediation process. A group membership remediation process may be, for example, a remediation process such as described in U.S. Published Patent Application 2011/0296490, owned by the assignee and incorporated by reference herein. As part of the group membership remediation process, the group memberships of at least one user of an enterprise network are replaced with alternative group memberships, which alternative group memberships provide continuous access to network objects residing on the enterprise network and which the user has historically accessed, while revoking access permissions to other network objects, which were not historically accessed by the user. The scope of the remediation process typically encompasses all network objects residing on the enterprise network.

For the purposes of the present application, the term "network object" is defined to include enterprise computer network resources. Examples of network objects include structured and unstructured computer data resources such as files and folders, disparate users and user groups.

As shown in FIG. 1B, the IT Administrator initiates a group membership remediation process at 22:00 in the evening. As further shown in FIG. 1B, Dan, an enterprise network user, arrives in the office the following morning and attempts to login to the enterprise network. However, Dan is refused access to the enterprise network and reports the issue to the IT Administrator.

Figure 1C:
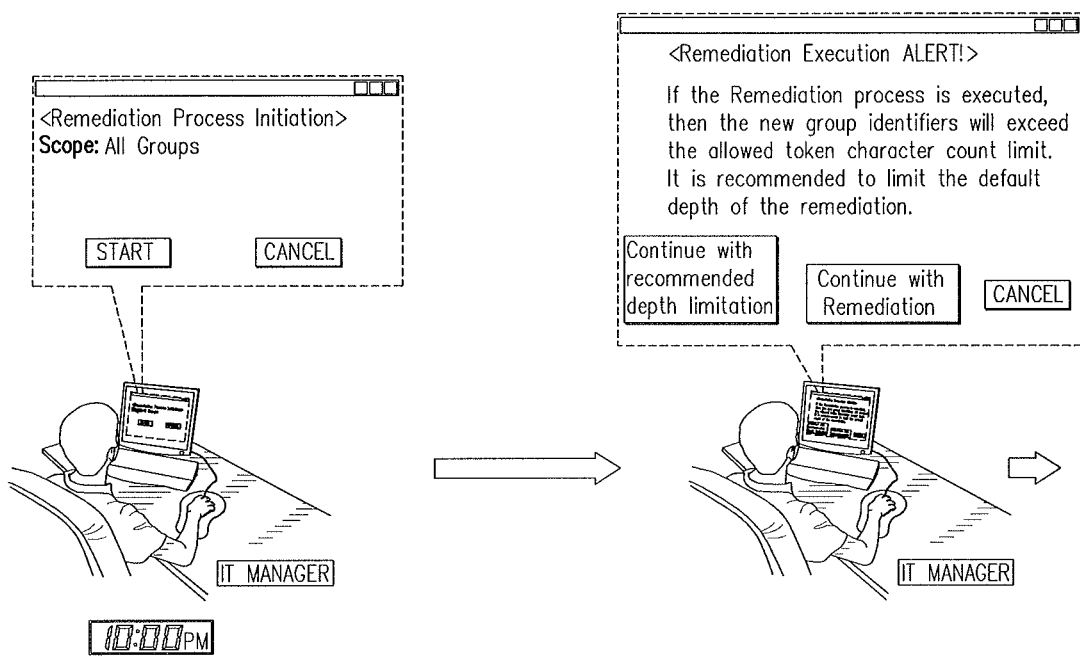

FIG. 1C illustrates one example of a solution to the token bloat condition of FIG. 1B. As shown in FIG. 1C, prior to executing the group membership remediation process for a particular user, the system of the present invention calculates the expected amount of information to be stored in the user authentication token assigned to the particular user as a result of the group membership remediation process. Upon ascertaining that the information to be stored in the token will exceed the capacity of the token, the system preferably alerts the IT Administrator of a potential token bloat condition, and recommends limiting the depth of the group membership remediation process so to minimize the amount of group membership information to be added to the user authentication token as a result of the group membership remediation process. The IT Administrator is then preferably prompted to indicate whether to proceed with the membership remediation process as originally requested by the IT Administrator or to accept the recommendation of the system and to limit the depth of the group membership remediation process.

It is appreciated that limiting the depth of the group membership remediation process typically results in fewer new group memberships being granted to the user, and therefore reduces the amount of group membership information which is added to the user authentication token as a result of the group membership remediation process.

It is further appreciated that, alternatively, upon ascertaining that the information to be stored in a token will exceed the capacity of the token, the system of the present invention may prevent execution of the group membership remediation process for the particular user.

Figure 1D:
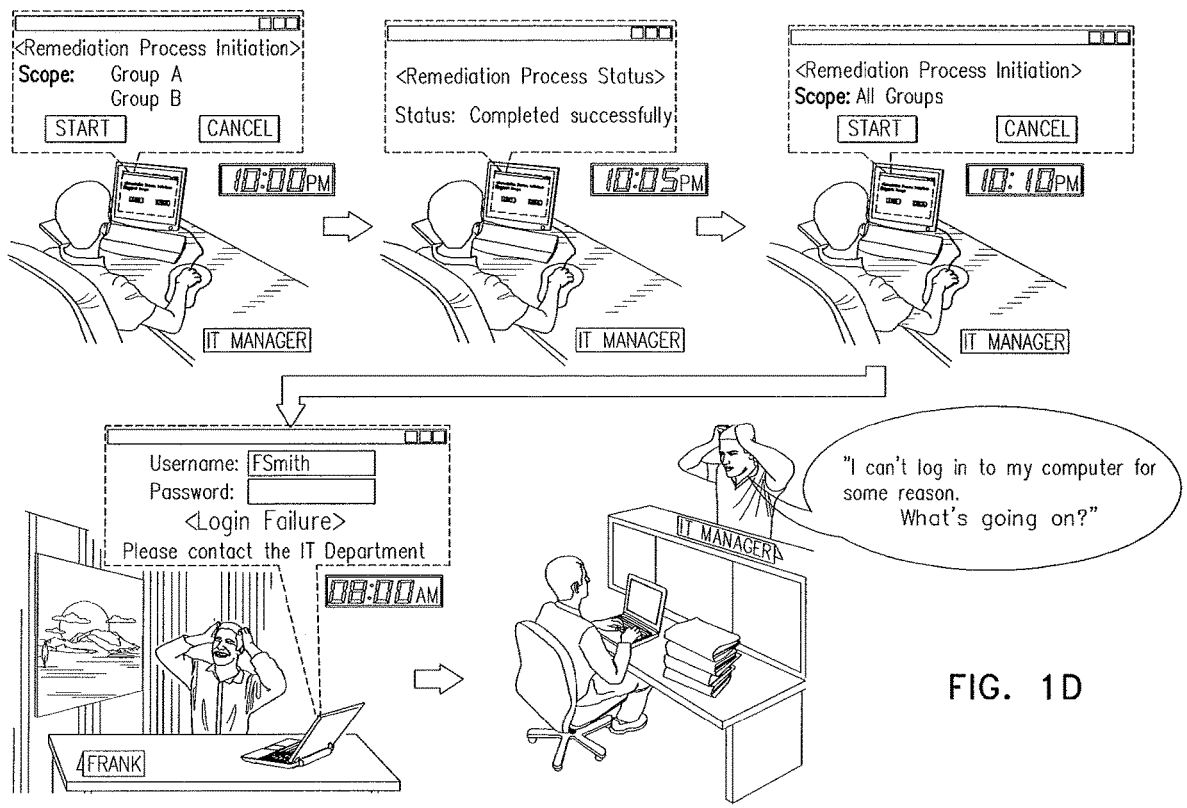

FIG. 1D illustrates another example of a solution to the token bloat condition of FIG. 1B. As shown in FIG. 1D, the IT Administrator, anticipating a possible condition of token bloat, initially executes a limited group membership remediation process. Upon receiving confirmation, from the system of the present invention, that the execution of the limited group membership remediation process did not create a condition of token bloat, the IT Administrator then executes a full group membership remediation process.

It is appreciated, however, that while successful execution of the limited group membership remediation without creating a condition of token bloat may be indicative of potential subsequent success of executing a full group membership remediation process, successful execution of a full group membership remediation process is not guaranteed and may eventually lead to a condition of token bloat, as further shown in FIG. 1D. The method of FIGS. 1A-1D therefore also preferably includes providing an alert if execution of the full group membership remediation process can be expected to result in an excess user authentication token utilization condition, even if execution of the limited group membership remediation process cannot be expected to result in an excess user authentication token utilization condition, this alert being similar to the alert described with reference to FIG. 1C.

Additionally, the method may also include preventing execution of the limited group membership remediation if execution of the full group membership remediation process is expected to result in an excess user authentication token utilization condition.

Yet additionally, the method may also include modifying execution of the limited group membership remediation process if execution of the full group membership remediation process is expected to result in an excess user authentication token utilization condition, thereby ensuring that a further full group membership remediation process will not result in an excess user authentication token utilization condition, even if the limited group membership remediation process cannot be expected to result in an excess user authentication token utilization condition.

Figure 2A:
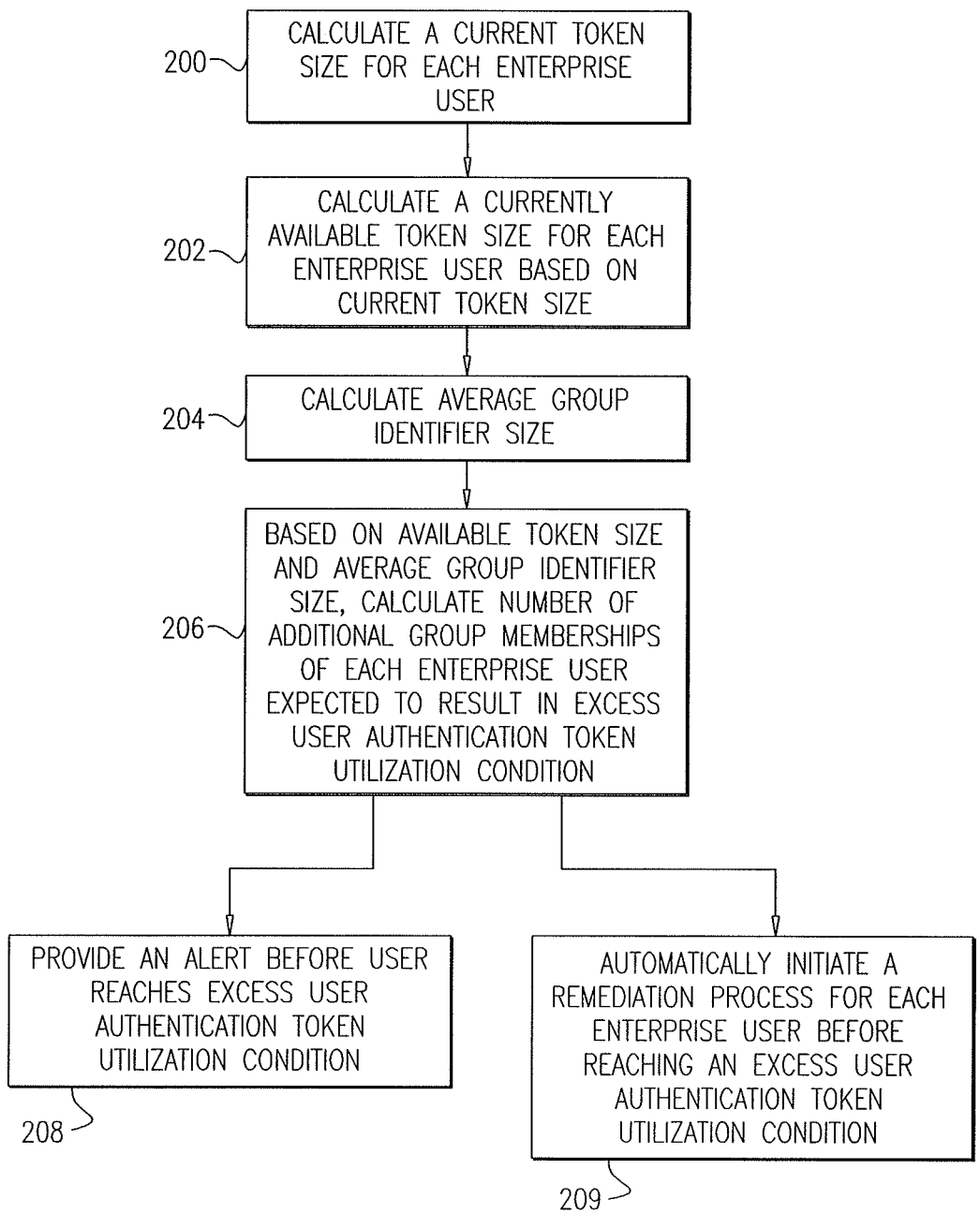
FIGS. 2A and 2B are simplified flowcharts illustrating steps in the operation of a system and methods for ascertaining whether an excess user authentication token utilization condition is imminent in an enterprise computer environment, operative in accordance with a preferred embodiment of the present invention.
Figure 2B:
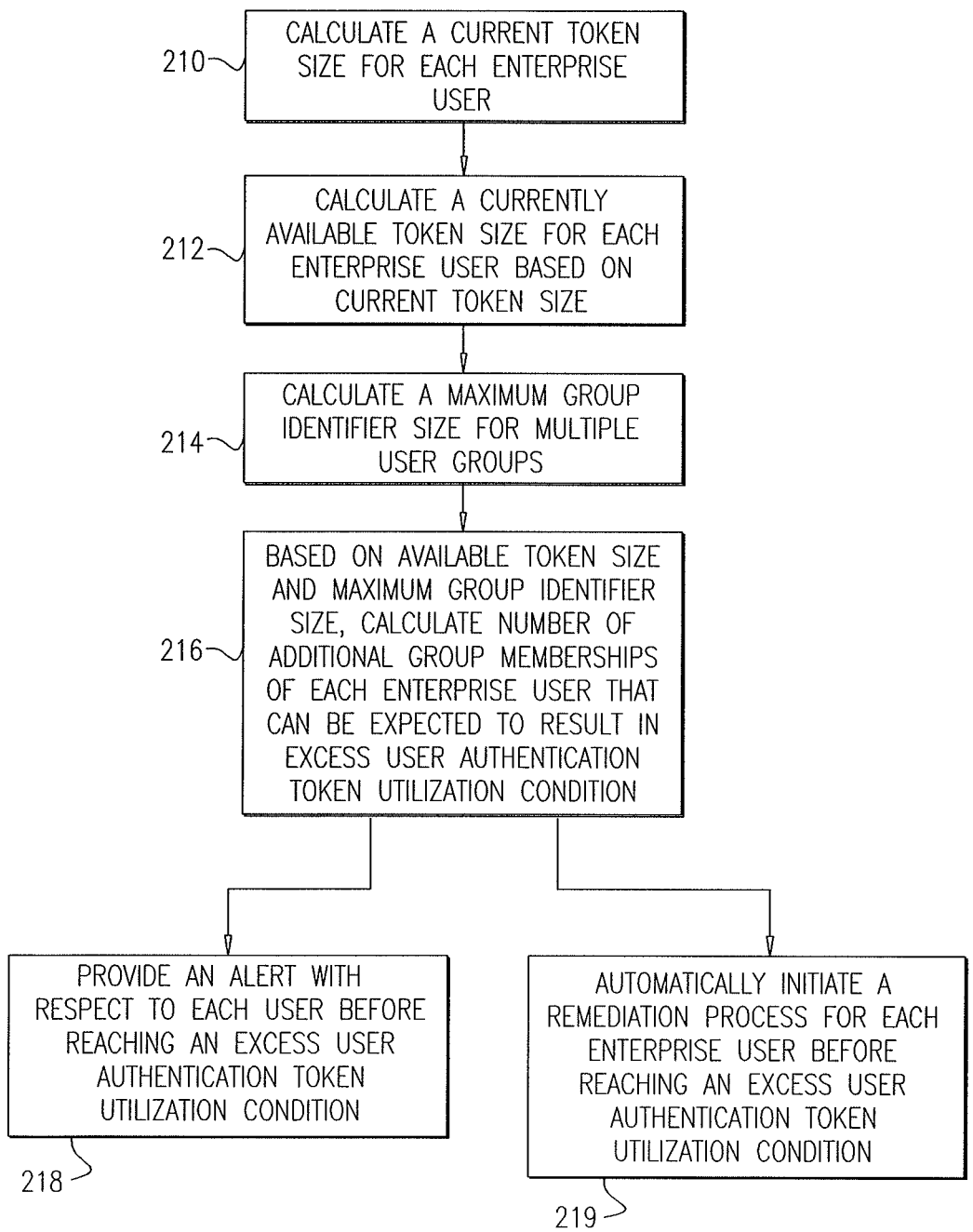

Reference is now made to FIGS. 2A and 2B, which are simplified flowcharts illustrating steps in the execution of methods for ascertaining whether an excess user authentication token utilization condition is imminent in an enterprise computer environment, operative in accordance with a preferred embodiment of the present invention.

As shown in FIG. 2A, a first method for ascertaining whether an excess user authentication token utilization condition is imminent in an enterprise computer environment initially includes calculating a current token size for each enterprise user in an enterprise computer environment (200). A method for calculating a current token size for an enterprise user will be described hereinbelow with reference to FIG. 3.

The method also preferably includes calculating a currently available token size for each enterprise user based on the current token size (202).

Thereafter, the method preferably includes calculating an average group identifier size for multiple user groups in the enterprise computer environment (204) and, based on the available token size and the average group identifier size, calculating the number of additional group memberships of each of the enterprise users that can be expected to result in an excess user authentication token utilization condition (206).

Preferably, the method also includes providing an alert with respect to each of the enterprise users before the user reaches an excess user authentication token utilization condition (208).

Additionally or alternatively, the method also includes automatically initiating a remediation process for each of the enterprise users before the user reaches an excess user authentication token utilization condition (209). As described hereinabove, a remediation process may be, for example, a remediation process such as described in U.S. Published Patent Application 2011/0296490, owned by the assignee and incorporated by reference herein. As part of the remediation process, the group memberships of a user of an enterprise network are replaced with alternative group memberships, which alternative group memberships provide continuous access to network objects residing on the enterprise network and which the user has historically accessed, while revoking access permissions to other network objects, which were not historically accessed by the user. The remediation process is therefore useful in reducing the number of groups of which a user is a member, thereby reducing the current token size of the user.

Turning now to FIG. 2B, it is shown that a second method for ascertaining whether an excess user authentication token utilization condition is imminent in an enterprise computer environment initially includes calculating a current token size for enterprise users in an enterprise computer environment (210) A method for calculating a current token size for an enterprise user will be described hereinbelow with reference to FIG. 3.

The method also preferably includes calculating a currently available token size for each of the enterprise users based on the current token size (212)

Thereafter, the method preferably includes calculating a maximum group identifier size for multiple user groups in the enterprise computer environment (214) and based on the available token size and the maximum group identifier size, calculating the number of additional group memberships of each of the enterprise users that can be expected to result in an excess user authentication token utilization condition (216).

Preferably, the method also includes providing an alert with respect to each of the enterprise users before the user reaches an excess user authentication token utilization condition (218).

Additionally or alternatively, the method also includes automatically initiating a remediation process for each of the enterprise users before the user reaches an excess user authentication token utilization condition (219). As described hereinabove, a remediation process may be, for example, a remediation process such as described in U.S. Published Patent Application 2011/0296490, owned by the assignee and incorporated by reference herein. As part of the remediation process, the group memberships of a user of an enterprise network are replaced with alternative group memberships, which alternative group memberships provide continuous access to network objects residing on the enterprise network and which the user has historically accessed, while revoking access permissions to other network objects, which were not historically accessed by the user. The remediation process is therefore useful in reducing the number of groups of which a user is a member, thereby reducing the current token size of the user.

Figure 3:
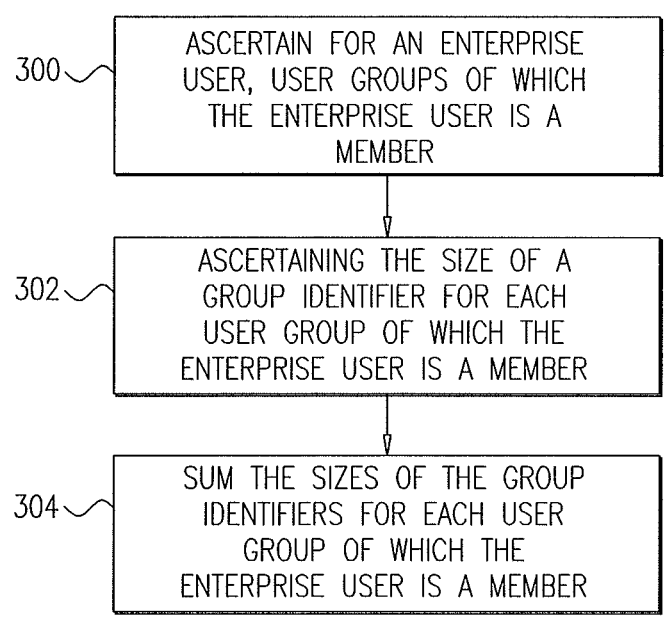
FIG. 3 is a simplified flowchart illustrating steps in the operation of a system and method for calculating current user authentication token size for enterprise users in an enterprise computer environment, operative in accordance with a preferred embodiment of the present invention.

Reference is now made to FIG. 3, which is a simplified flowchart illustrating steps in the execution of a method for calculating current token size for enterprise users in an enterprise computer environment, operative in accordance with a preferred embodiment of the present invention.

As shown in FIG. 3, the method preferably includes ascertaining for an enterprise user, user groups of which the enterprise user is a member (300). Thereafter, the method includes ascertaining the size of a group identifier for each of the user groups of which the enterprise user is a member (302) and summing the sizes of the group identifiers for each of the user groups of which the enterprise user is a member to arrive at a current token size for the enterprise user (304).

It is appreciated that the method of FIG. 3 may be carried out intermittently, periodically or on a pre-scheduled basis. Additionally or alternatively, the method may be carried out in response to group membership change events.

Figure 4:
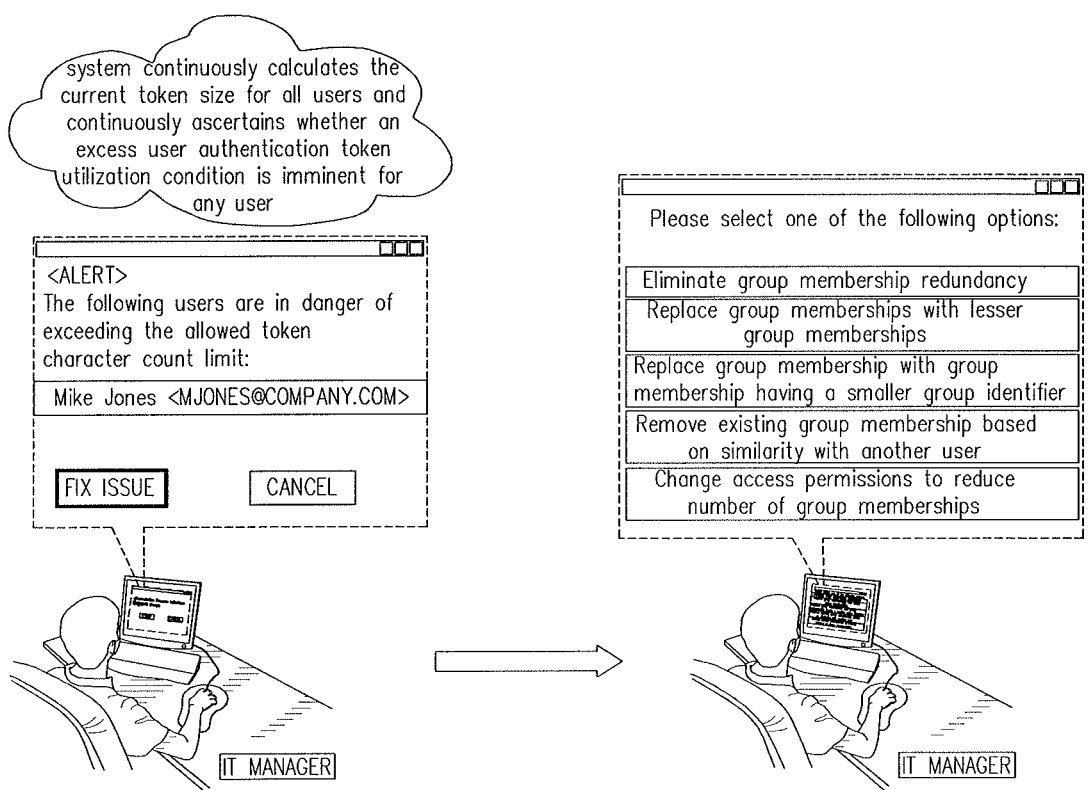
FIG. 4 is a simplified pictorial illustration which illustrates steps in the operation of a system and method for remediating the size of a user authentication token of an enterprise user in an enterprise computer environment, operative in accordance with a preferred embodiment of the present invention.

Reference is now made to FIG. 4, which is a simplified pictorial illustration which illustrates steps in the execution of a method for remediating the size of a user authentication token of an enterprise user in an enterprise computer environment, operative in accordance with a preferred embodiment of the present invention, and to FIGS. 5A-5E, which are simplified pictorial illustrations which illustrate examples of steps in the execution of a method for remediating the size of a user authentication token of an enterprise user in an enterprise computer environment, further to the steps illustrated in FIG. 4.

As shown in FIG. 4, the system of the present invention preferably continuously calculates the current user authentication token size for all users of the enterprise computer environment. As described hereinabove, it is appreciated that the user authentication token size typically changes over time as group memberships are added or removed from the user authentication token of any given user. A method by which a current user authentication token size may be calculated is described hereinabove with reference to FIG. 3.

As further shown in FIG. 4, the system continuously ascertains whether an excess user authentication token utilization condition is imminent for any given user. A method by which the system may ascertain whether an excess user authentication token utilization condition is imminent for any given user is described hereinabove with reference to FIGS. 2A and 2B.

Upon ascertaining that an excess user authentication token utilization condition is imminent for one or more given enterprise users, the system preferably alerts an IT Administrator of the enterprise network that an excess user authentication token utilization condition is imminent for those given enterprise users, and the IT Administrator is preferably prompted to remediate the size of the user authentication tokens of each of those enterprise users. Alternatively, the system may execute the remediation process automatically without prompting the IT Administrator.

Upon selecting to remediate the size of the user authentication tokens, the IT Administrator is presented with a list of options to select from, each of the selectable options being operative to remediate the size of the user authentication tokens. The selectable options may include, for example:

eliminating group membership redundancy of an enterprise user;

replacing a plurality of existing group memberships with a lesser plurality of group memberships;

replacing an existing group membership having a group identifier of a first size with a group membership having a group identifier of a second size, smaller than the first size;

removing an existing group membership from the enterprise user, based on a similarity between the enterprise user and an additional user, the similarity being based on a similarity of actual access of the enterprise user and the additional user; and changing access permissions within the enterprise computer environment in order to reduce the number of existing group memberships.

Remediation of the size of the user authentication tokens according to each of the aforementioned selectable options is described hereinbelow in a corresponding one of FIGS. 5A-5E. It is appreciated that in each of the following examples, the IT Administrator may be prompted to approve or confirm execution of the selected remediation option prior to actual execution of the selected remediation option.

Figure 5A:
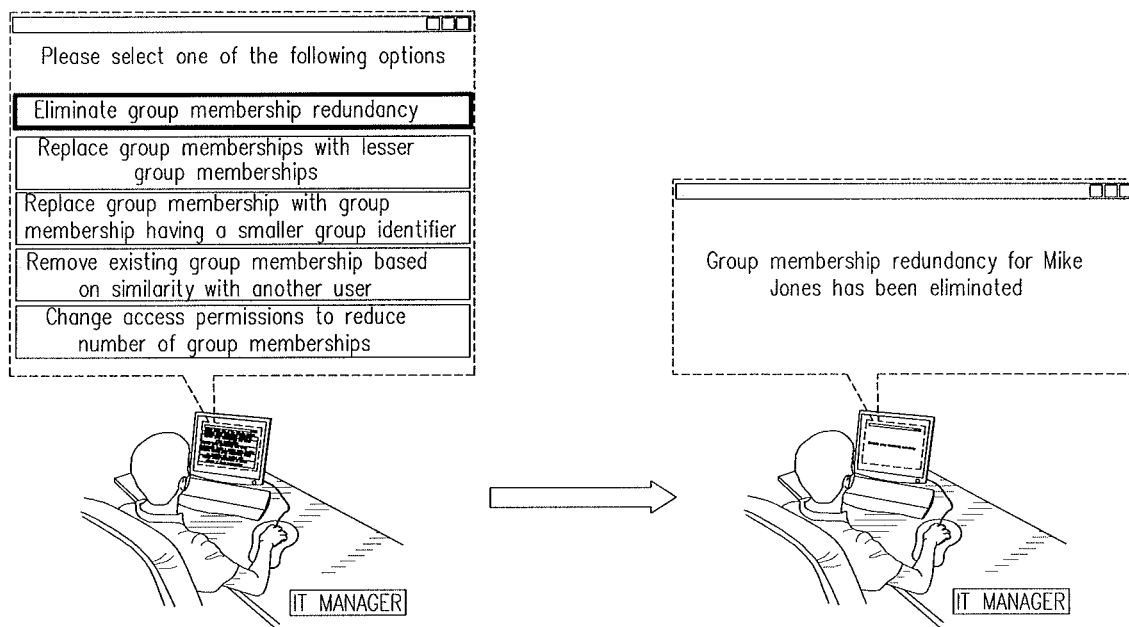
FIGS. 5A-5E are simplified pictorial illustrations which illustrate examples of steps in the operation of the system and method for remediating the size of a user authentication token of an enterprise user in an enterprise computer environment, further to the steps illustrated in FIG. 4.

As shown in the example of FIG. 5A, upon receiving an alert that an excess user authentication token utilization condition is imminent for a given enterprise user, the IT Administrator selects a remediation option which include eliminating group membership redundancy of the given enterprise user. It is appreciated that a given enterprise user may be a member of a multiplicity of groups, membership in each of which groups granting redundant access permissions to one or more particular network objects. Upon eliminating group membership redundancy of a given enterprise user, the enterprise user preferably retains access to the particular network objects while the number of groups in which he is a member is reduced. It is appreciated that by reducing the number of group memberships of a given user, a lesser amount of group identifiers is stored in the authentication token assigned to the given user, thereby preventing an excess user authentication token utilization condition.

Figure 5B:
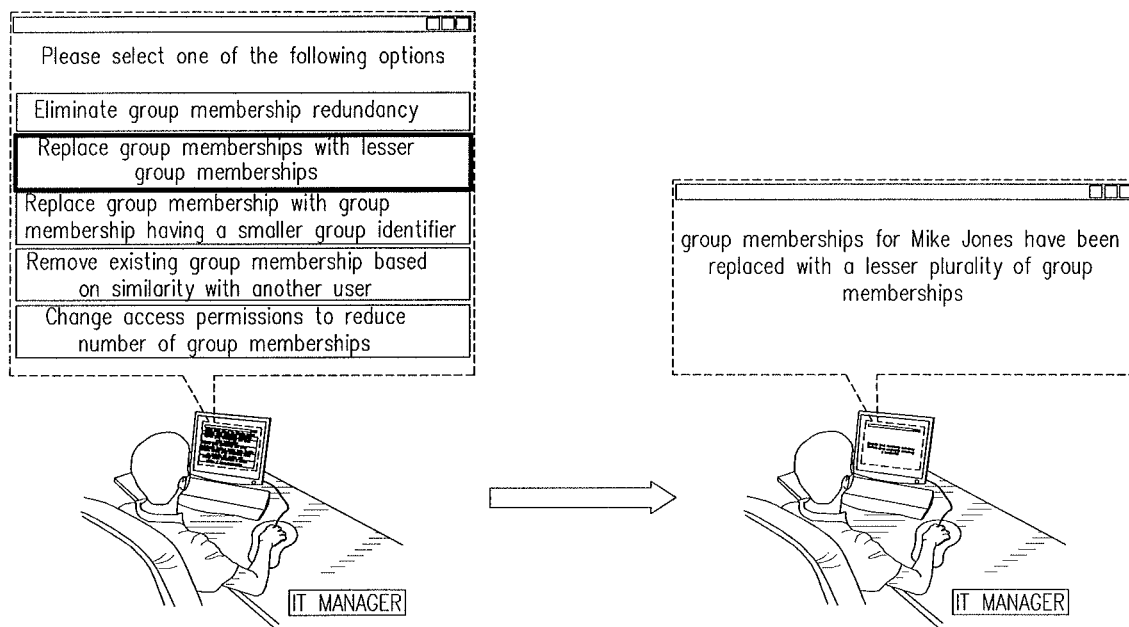

Turning now to the example of FIG. 5B, upon receiving an alert that an excess user authentication token utilization condition is imminent for a given enterprise user, the IT Administrator selects a remediation option which includes replacing a plurality of existing group memberships of the given enterprise user with a lesser plurality of group memberships. It is appreciated that a given enterprise user may be a member of a multiplicity of groups, the combination of which multiplicity of memberships granting the given enterprise user access permissions to a multiplicity of network objects. Upon activating the remediation option illustrated FIG. 5B, the plurality of existing group memberships of the given enterprise user is preferably replaced with a lesser plurality of group memberships, the lesser plurality of group memberships providing access permissions to a set of network objects which access permissions are identical to those provided to the given enterprise user by the plurality of existing group memberships. It is appreciated that by reducing the number of group memberships of a given user, a lesser amount of group identifiers is stored in the authentication token assigned to the given user, thereby preventing an excess user authentication token utilization condition.

Figure 5C:
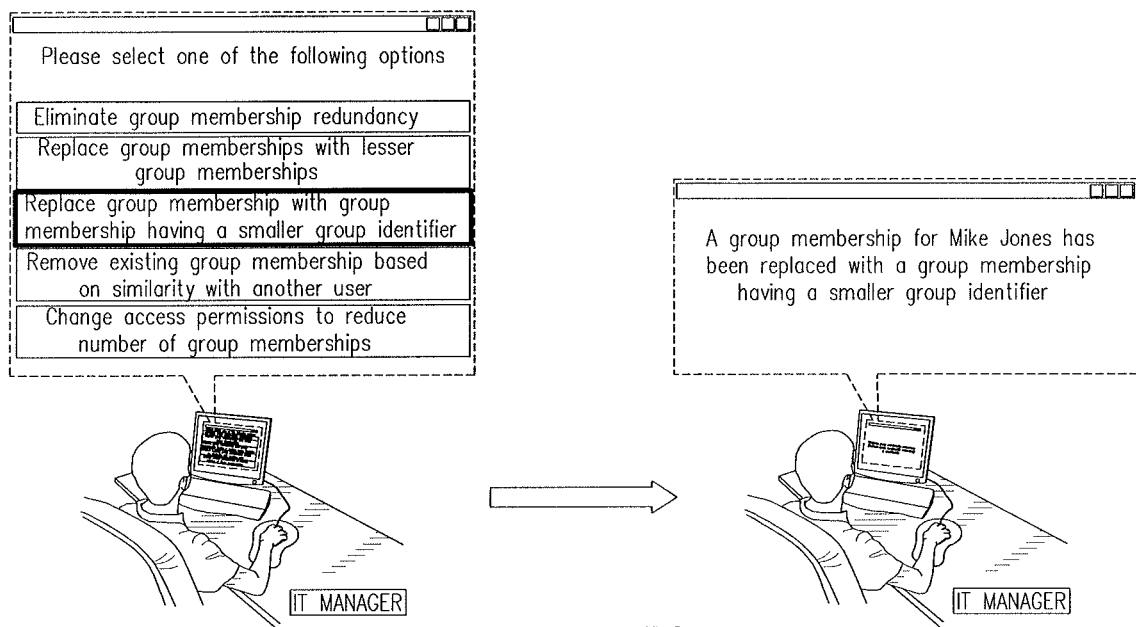

Turning further to the example of FIG. 5C, upon receiving an alert that an excess user authentication token utilization condition is imminent for a given enterprise user, the IT Administrator selects a remediation option which includes replacing an existing membership of the given user to a group having a group identifier of a first size with a membership to a group having a group identifier of a second size, smaller than the first size, membership to the group having a group identifier of a second size providing access permissions to a set of network objects which access permissions are identical to those provided to the given enterprise user by the existing group membership. As described hereinabove, each enterprise user is assigned an authentication token which is limited in size and which includes, for each group of which the user is a member, a group identifier. Upon activating the remediation option illustrated FIG. 5C, a group identifier stored in the authentication token assigned to the user is replaced by a group identifier of a lesser size, thereby remediating the size of the user authentication token and preventing an excess user authentication token utilization condition.

Figure 5D:
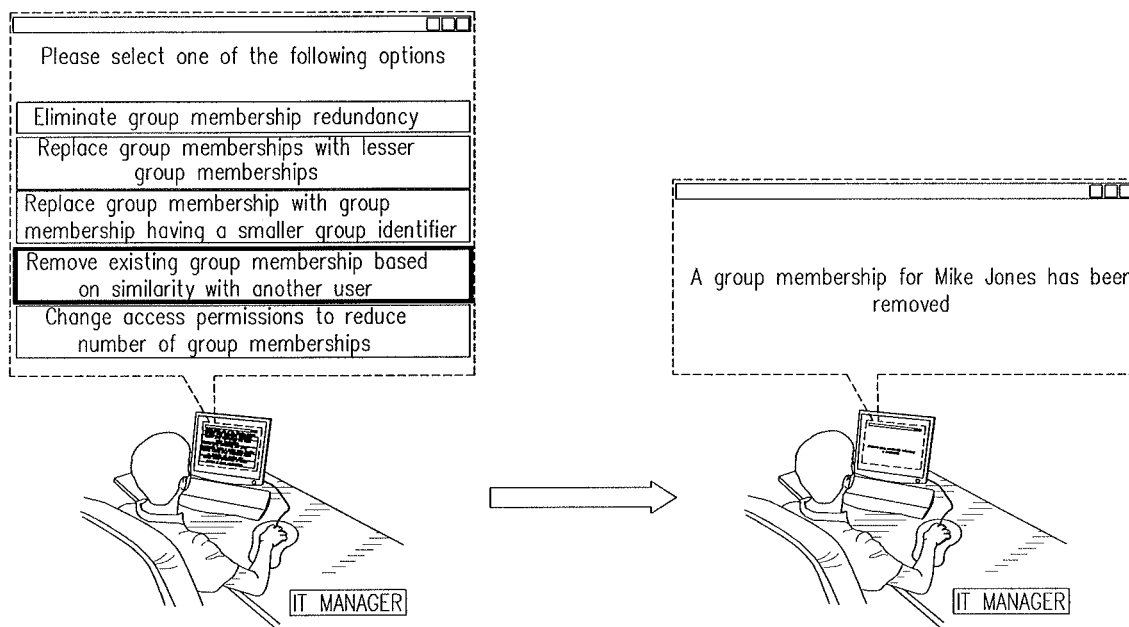

In the example illustrated in FIG. 5D, upon receiving an alert that an excess user authentication token utilization condition is imminent for a given enterprise user, the IT Administrator selects a remediation option which includes removing an existing group membership from the enterprise user, based on a similarity between the enterprise user and an additional user, the similarity being based on a similarity of actual access of the enterprise user and the additional user. It is appreciated that a similarity of actual access between an enterprise user and an additional user typically indicates that access permissions granted to the additional user would grant the enterprise user with access permissions which are sufficient for actually accessing network objects that the enterprise user has accessed in the past. It is therefore appreciated that upon detecting such a similarity of actual access, existing group memberships may be removed from the given enterprise user without disrupting access to network objects which the enterprise user has accessed in the past. By removing existing group memberships, corresponding group identifiers are removed from the authentication token assigned to the given enterprise user, thereby remediating the size of the user authentication token and preventing an excess user authentication token utilization condition.

Figure 5E:
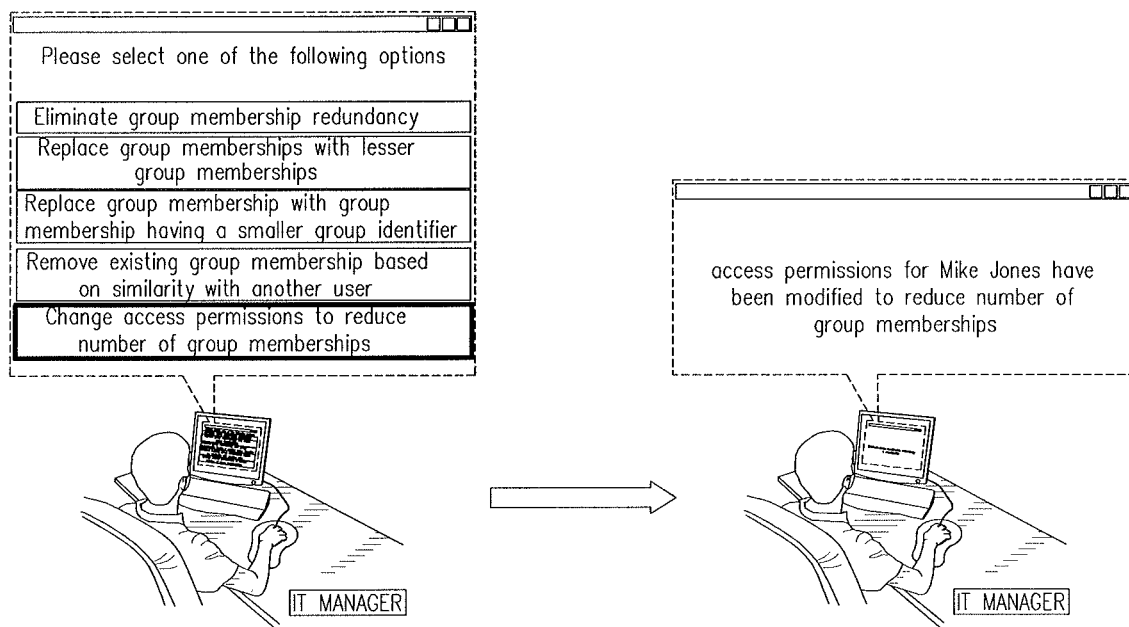

In the example illustrated in FIG. 5E, upon receiving an alert that an excess user authentication token utilization condition is imminent for a given enterprise user, the IT Administrator selects a remediation option which includes changing access permissions within the enterprise computer environment in order to reduce the number of existing group memberships. It is appreciated that, typically, a given enterprise user is provided access permissions to any given network object by granting the given enterprise user membership to a user group which grants access permissions to the given network object. It is therefore appreciated that, for example, reducing the number of network objects to which a given enterprise user should have access permissions to will typically allow for reduction of the number of user groups of which the given enterprise user is a member.

Reference is now made to FIGS. 6A-6E, which are simplified flowcharts illustrating steps in the execution of the examples of FIGS. 4 and 5A-5E.

Figure 6A:
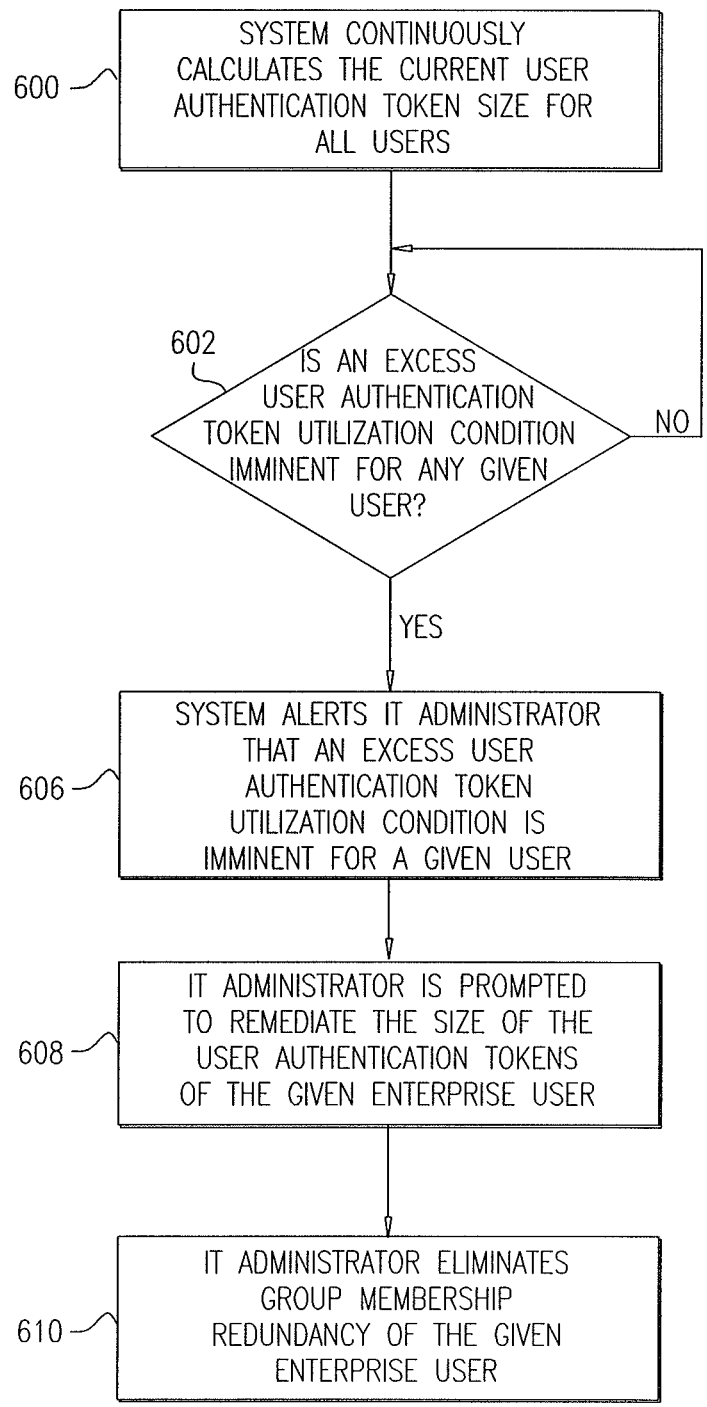
FIGS. 6A-6E are simplified flowcharts illustrating steps in the execution of the examples of FIGS. 4 and 5A-5E.

As shown in FIG. 6A and in the example illustrated in FIG. 4, the system of the present invention preferably continuously calculates the current user authentication token size for all users of the enterprise computer environment (600). As described hereinabove, it is appreciated that the user authentication token size typically changes over time as group memberships are added or removed from the user authentication token of any given user. A method by which a current user authentication token size may be calculated is described hereinabove with reference to FIG. 3.

As further shown in FIG. 6A, the system continuously ascertains whether an excess user authentication token utilization condition is imminent for any given user (602). A method by which the system may ascertain whether an excess user authentication token utilization condition is imminent for any given user is described hereinabove with reference to FIGS. 2A and 2B.

Upon ascertaining that an excess user authentication token utilization condition is imminent for a given enterprise user, the system preferably alerts an IT Administrator of the enterprise network that an excess user authentication token utilization condition is imminent for the given enterprise user (606), and the IT Administrator is preferably prompted to remediate the size of the user authentication tokens of the given enterprise users (608). In response, as illustrated in the example of FIG. 5A, the IT Administrator eliminates group membership redundancy of the given enterprise user (610). It is appreciated that a given enterprise user may be a member of a multiplicity of groups, membership in each of which groups granting redundant access permissions to one or more particular network objects. Upon eliminating group membership redundancy of a given enterprise user, the enterprise user preferably retains access to the particular network objects while the number of groups in which he is a member is reduced. It is appreciated that by reducing the number of group memberships of a given user, a lesser amount of group identifiers is stored in the authentication token assigned to the given user, thereby preventing an excess user authentication token utilization condition.

Figure 6B:
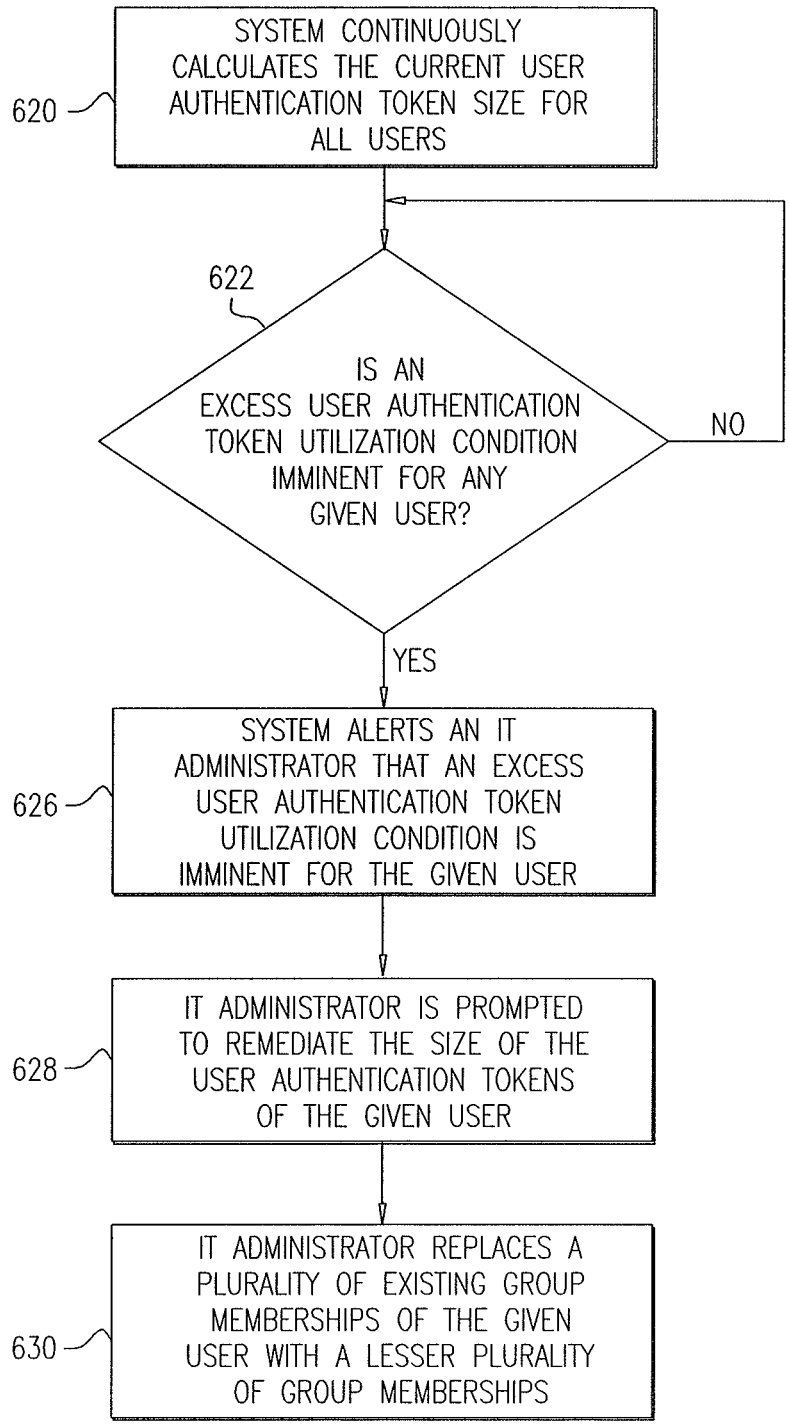

Turning now to the example of FIG. 6B, it is shown that the system of the present invention preferably continuously calculates the current user authentication token size for all users of the enterprise computer environment (620), as illustrated in FIG. 4. As described hereinabove, it is appreciated that the user authentication token size typically changes over time as group memberships are added or removed from the user authentication token of any given user. A method by which a current user authentication token size may be calculated is described hereinabove with reference to FIG. 3.

As further shown in FIG. 6B, the system continuously ascertains whether an excess user authentication token utilization condition is imminent for any given user (622). A method by which the system may ascertain whether an excess user authentication token utilization condition is imminent for any given user is described hereinabove with reference to FIGS. 2A and 2B.

Upon ascertaining that an excess user authentication token utilization condition is imminent for a given enterprise user, the system preferably alerts an IT Administrator of the enterprise network that an excess user authentication token utilization condition is imminent for the given enterprise user (626), and the IT Administrator is preferably prompted to remediate the size of the user authentication tokens of the given enterprise user (628). In response, as illustrated in the example of FIG. 5B, the IT Administrator replaces a plurality of existing group memberships of the given enterprise user with a lesser plurality of group memberships (630), the lesser plurality of group memberships providing access permissions to a set of network objects which access permissions are identical to those provided to the given enterprise user by the plurality of existing group memberships. It is appreciated that by reducing the number of group memberships of a given user, a lesser amount of group identifiers is stored in the authentication token assigned to the given user, thereby preventing an excess user authentication token utilization condition.

Figure 6C:
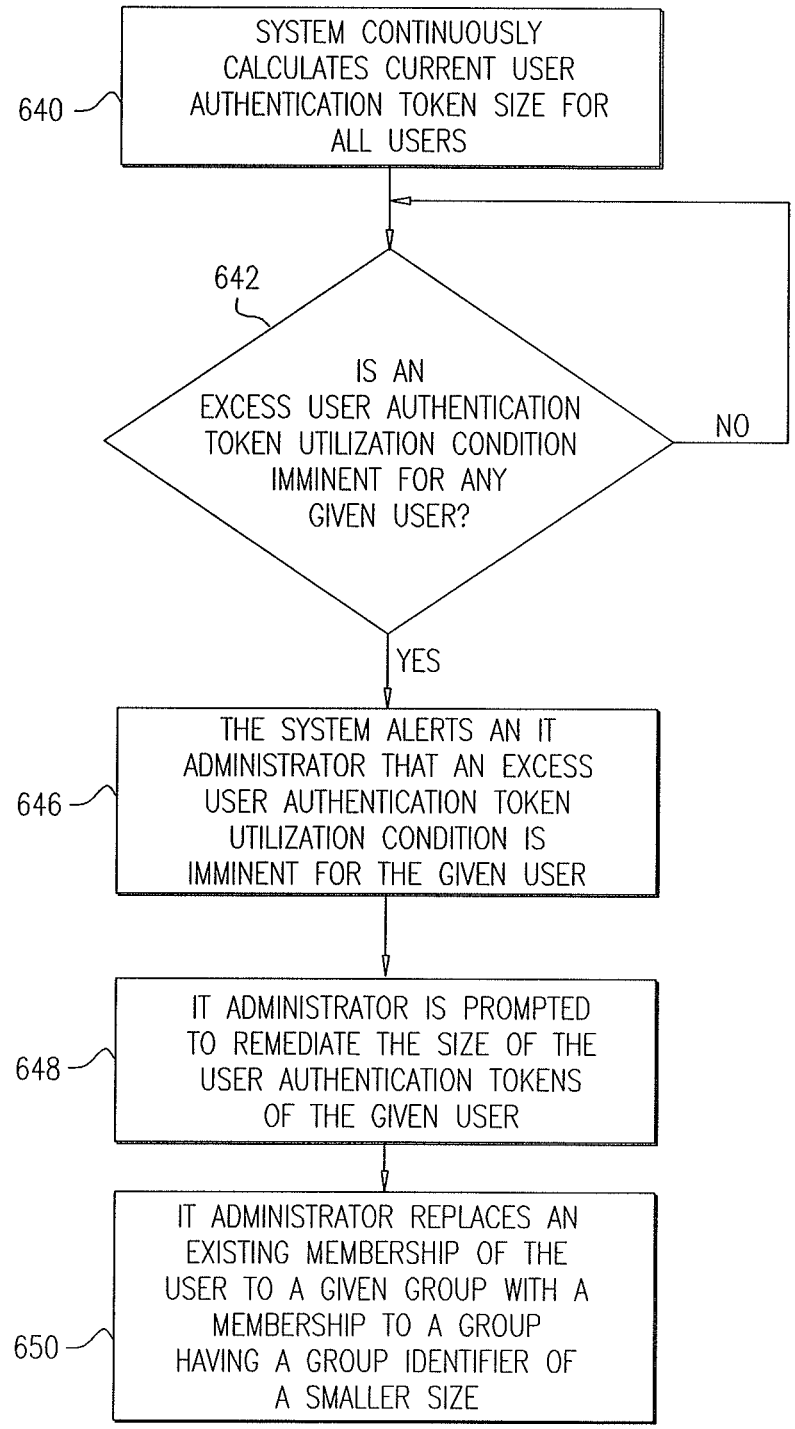

Turning now to the example of FIG. 6C, it is shown that the system of the present invention preferably continuously calculates the current user authentication token size for all users of the enterprise computer environment (640), as illustrated in FIG. 4. As described hereinabove, it is appreciated that the user authentication token size typically changes over time as group memberships are added or removed from the user authentication token of any given user. A method by which a current user authentication token size may be calculated is described hereinabove with reference to FIG. 3.

As further shown in FIG. 6C, the system continuously ascertains whether an excess user authentication token utilization condition is imminent for any given user (642). A method by which the system may ascertain whether an excess user authentication token utilization condition is imminent for any given user is described hereinabove with reference to FIGS. 2A and 2B.

Upon ascertaining that an excess user authentication token utilization condition is imminent for a given enterprise user, the system preferably alerts an IT Administrator of the enterprise network that an excess user authentication token utilization condition is imminent for the given enterprise user (646), and the IT Administrator is preferably prompted to remediate the size of the user authentication tokens of the given enterprise user (648). In response, as illustrated in the example of FIG. 5C, the IT Administrator replaces an existing membership of the given user to a given group, the given group having a group identifier of a first size, with a membership to a group having a group identifier of a second size, smaller than the first size (650), wherein membership to the group having a group identifier of a second size provides access permissions to a set of network objects which access permissions are identical to those provided to the given enterprise user by the existing group membership, thereby remediating the size of the user authentication token and preventing an excess user authentication token utilization condition.

Figure 6D:
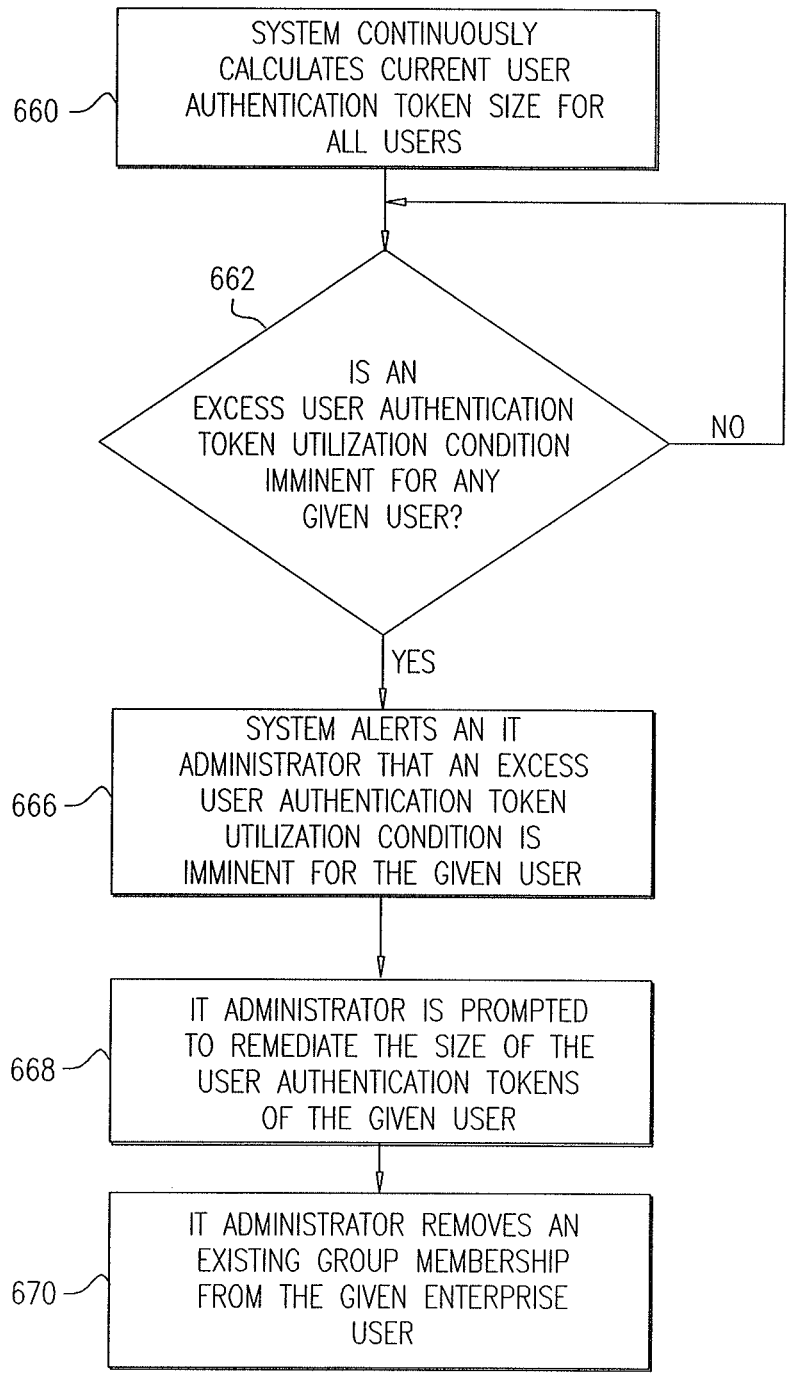

Turning now to the example of FIG. 6D, it is shown that the system of the present invention preferably continuously calculates the current user authentication token size for all users of the enterprise computer environment (660), as illustrated in FIG. 4. As described hereinabove, it is appreciated that the user authentication token size typically changes over time as group memberships are added or removed from the user authentication token of any given user. A method by which a current user authentication token size may be calculated is described hereinabove with reference to FIG. 3.

As further shown in FIG. 6D, the system continuously ascertains whether an excess user authentication token utilization condition is imminent for any given user (662). A method by which the system may ascertain whether an excess user authentication token utilization condition is imminent for any given user is described hereinabove with reference to FIGS. 2A and 2B.

Upon ascertaining that an excess user authentication token utilization condition is imminent for a given enterprise user, the system preferably alerts an IT Administrator of the enterprise network that an excess user authentication token utilization condition is imminent for the given enterprise user (666), and the IT Administrator is preferably prompted to remediate the size of the user authentication tokens of the given enterprise user (668). In response, as illustrated in the example of FIG. 5D, the IT Administrator removes an existing group membership from the given enterprise user (670), based on a similarity between the given enterprise user and an additional user, the similarity being based on a similarity of actual access of the enterprise user and the additional user. It is appreciated that a similarity of actual access between an enterprise user and an additional user typically indicates that access permissions granted to the additional user would grant the enterprise user with access permissions which are sufficient for actually accessing network objects that the enterprise user has accessed in the past. It is therefore appreciated that upon detecting such a similarity of actual access, existing group memberships may be removed from the given enterprise user without disrupting access to network objects which the enterprise user has accessed in the past. By removing existing group memberships, corresponding group identifiers are removed from the authentication token assigned to the given enterprise user, thereby remediating the size of the user authentication token and preventing an excess user authentication token utilization condition.

Figure 6E:
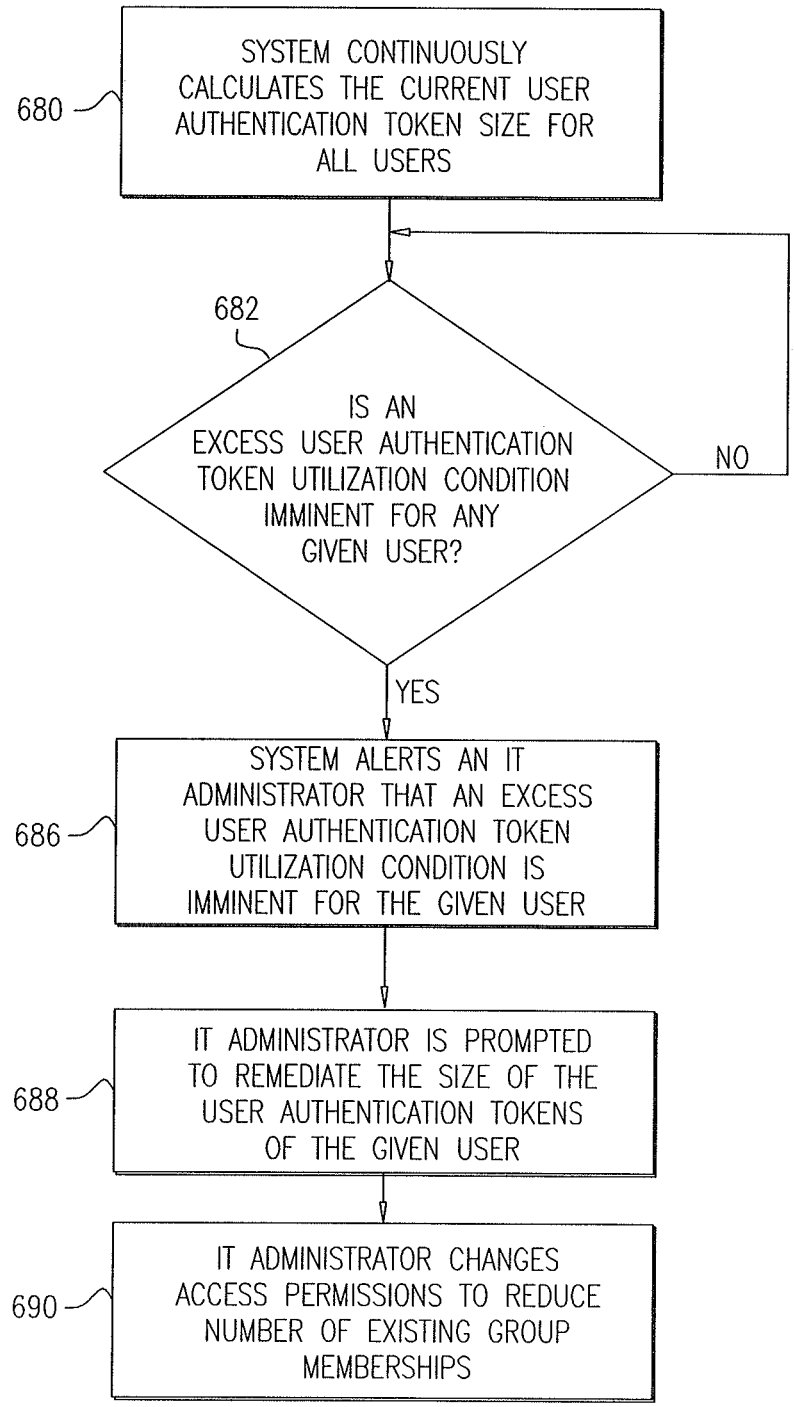

Turning now to the example of FIG. 6E, it is shown that the system of the present invention preferably continuously calculates the current user authentication token size for all users of the enterprise computer environment (680), as illustrated in FIG. 4. As described hereinabove, it is appreciated that the user authentication token size typically changes over time as group memberships are added or removed from the user authentication token of any given user. A method by which a current user authentication token size may be calculated is described hereinabove with reference to FIG. 3.

As further shown in FIG. 6E, the system continuously ascertains whether an excess user authentication token utilization condition is imminent for any given user (682). A method by which the system may ascertain whether an excess user authentication token utilization condition is imminent for any given user is described hereinabove with reference to FIGS. 2A and 2B.

Upon ascertaining that an excess user authentication token utilization condition is imminent for a given enterprise user, the system preferably alerts an IT Administrator of the enterprise network that an excess user authentication token utilization condition is imminent for the given enterprise user (686), and the IT Administrator is preferably prompted to remediate the size of the user authentication tokens of the given enterprise user (688). In response, as illustrated in the example of FIG. 5E, the IT Administrator changes access permissions within the enterprise computer environment in order to reduce the number of existing group memberships. It is appreciated that, typically, a given enterprise user is provided access permissions to any given network object by granting the given enterprise user membership to a user group which grants access permissions to the given network object. It is therefore appreciated that, for example, reducing the number of network objects to which a given enterprise user should have access permissions to will typically allow for reduction of the number of user groups of which the given enterprise user is a member.

Figure 7A:
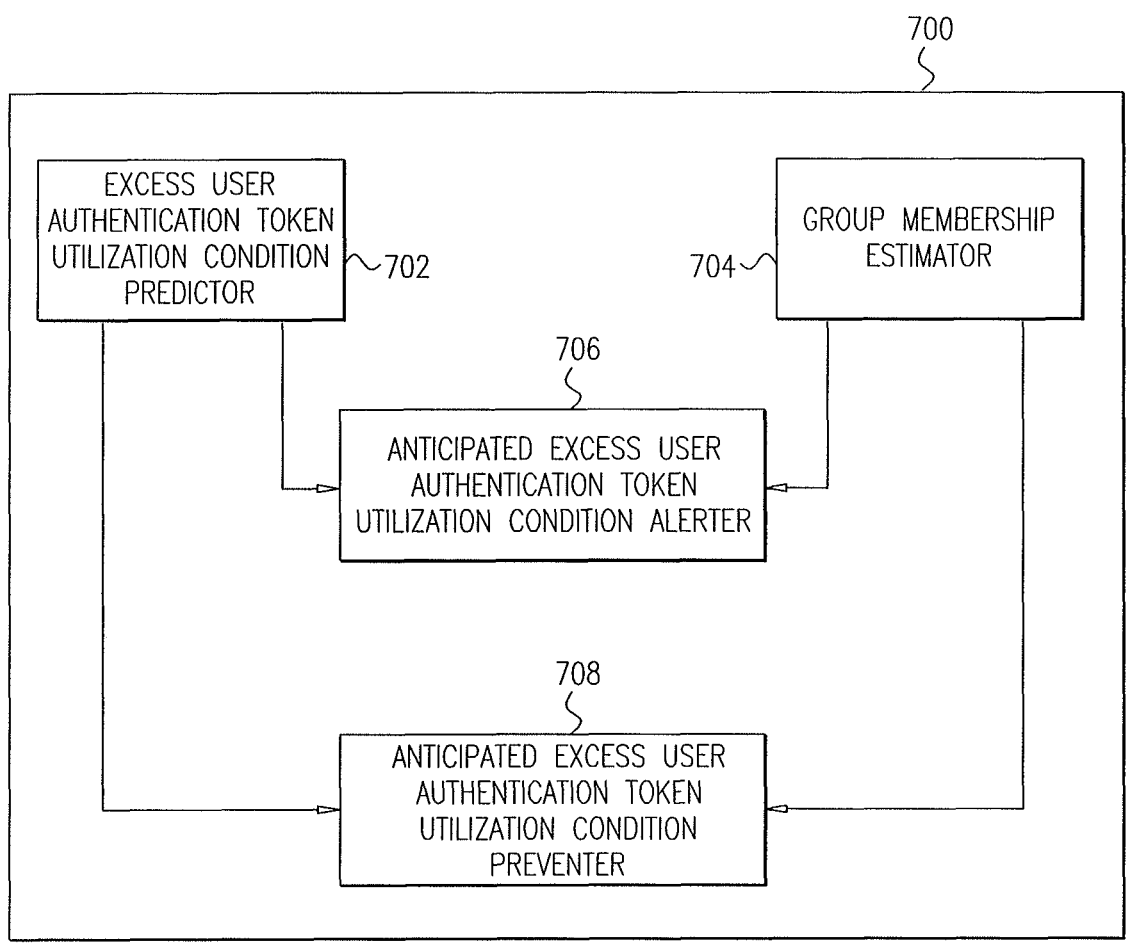
FIG. 7A is a simplified block diagram illustration of a system for preventing an excess user authentication token utilization condition in an enterprise computer environment employed in the examples of FIGS. 1A-6E.

Reference is now made to FIG. 7A, which is a simplified block diagram illustration of a system for preventing an excess user authentication token utilization condition in an enterprise computer environment employed in the examples of FIGS. 1A-6E.

As shown in FIG. 7A, the system 700 of FIGS. 1A-6E preferably includes an excess user authentication token utilization condition predictor 702 operable for calculating a number of additional group memberships of each of the enterprise users that can be expected to result in an excess user authentication token utilization condition. System 700 also preferably includes a group membership estimator 704 operable, for each the enterprise user, for estimating a number of additional group memberships of the enterprise user that will be created by an anticipated activity, and an anticipated excess user authentication token utilization condition alerter 706 communicating with excess user authentication token utilization condition predictor 702 and with group membership estimator 704 and operable, before initiation of the anticipated activity, for providing an alert if the anticipated activity can be expected to result in an excess user authentication token utilization condition.

It is appreciated that additionally or alternatively, system 700 may also include an anticipated excess user authentication token utilization condition preventer 708 communicating with excess user authentication token utilization condition predictor 702 and with group membership estimator 704 and operable for preventing execution of the anticipated activity if the anticipated activity can be expected to result in an excess user authentication token utilization condition.

It is yet further appreciated that additionally or alternatively, anticipated excess user authentication token utilization condition preventer 708 may also be operable, in a case where the anticipated activity can be expected to result in an excess user authentication token utilization condition, for modifying the anticipated activity so as to ensure that execution of the modified activity cannot be expected to result in an excess user authentication token utilization condition.

It is yet further appreciated that group membership estimator 704 may also be operable, before initiation of a first anticipated activity of a first scope, for estimating a number of additional group memberships of said enterprise user that will be created by a further anticipated activity having a second scope different from and non-overlapping the first scope, and anticipated excess user authentication token utilization condition alerter 706 may also be operable for providing an alert if the further anticipated activity can be expected to result in an excess user authentication token utilization condition, even if the first anticipated activity cannot be expected to result in an excess user authentication token utilization condition.

Additionally, anticipated excess user authentication token utilization condition preventer 708 may also be operable for preventing execution of the first anticipated activity if the further anticipated activity can be expected to result in an excess user authentication token utilization condition, even if the first anticipated activity cannot be expected to result in an excess user authentication token utilization condition.

Alternatively, anticipated excess user authentication token utilization condition preventer 708 may be operable for modifying the first anticipated activity so as to ensure that the further anticipated activity cannot be expected to result in an excess user authentication token utilization condition, even if the first anticipated activity cannot be expected to result in an excess user authentication token utilization condition.

Figure 7B:
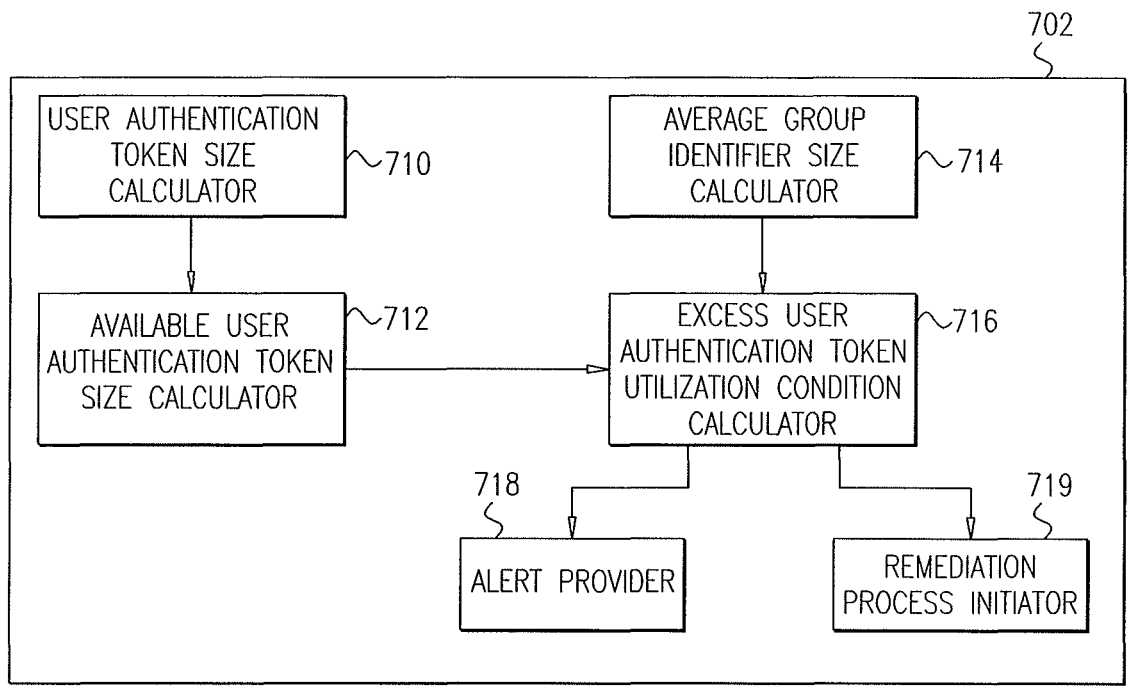
FIGS. 7B and 7C are simplified block diagram illustrations of alternative embodiments of an excess user authentication token utilization condition predictor which is part of the system of FIG. 7A.
Figure 7C:
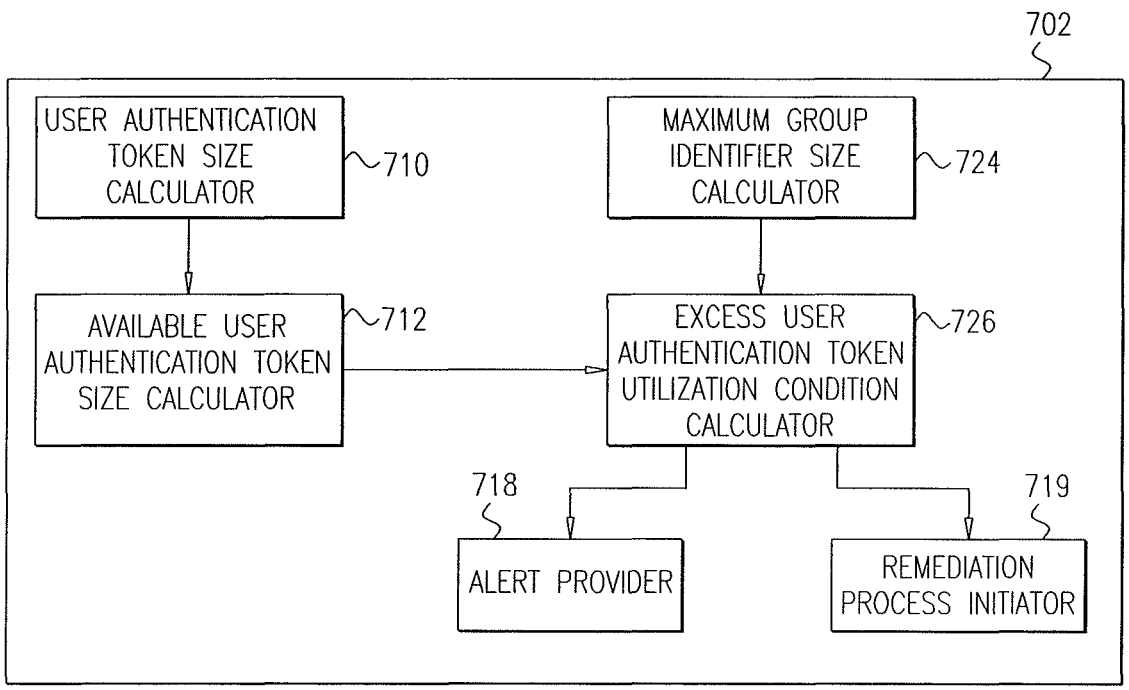

Reference is now made to FIGS. 7B and 7C, which are simplified block diagram illustrations of alternative embodiments of an excess user authentication token utilization condition predictor which is part of the system of FIG. 7A.

As shown in FIG. 7B, excess user authentication token utilization condition predictor 702 preferably includes a user authentication token size calculator 710 operable for calculating a current user authentication token size for each enterprise user in an enterprise computer environment. Excess user authentication token utilization condition predictor 702 preferably also includes an available user authentication token size calculator 712 communicating with user authentication token size calculator 710 and operable for calculating a currently available user authentication token size for each of the enterprise users based on the current user authentication token size, and an average group identifier size calculator 714 operable for calculating an average group identifier size for multiple user groups in the enterprise computer environment. An excess user authentication token utilization condition calculator 716 is preferably operable, based on the available user authentication token size calculated by available user authentication token size calculator 712 and the average group identifier size calculated by average group identifier size calculator 714, for calculating a number of additional group memberships of each of the enterprise users that can be expected to result in an excess user authentication token utilization condition.

Excess user authentication token utilization condition predictor 702 may also include an alert provider 718 communicating with excess user authentication token utilization condition calculator 716 and operable for providing an alert with respect to each of the enterprise users before the user reaches an excess user authentication token utilization condition.

Excess user authentication token utilization condition predictor 702 may also include a remediation process initiator 719 communicating with excess user authentication token utilization condition calculator 716 and operable for initiating a remediation process for each of the enterprise users before the user reaches an excess user authentication token utilization condition. As described hereinabove, a remediation process may be, for example, a remediation process such as described in U.S. Published Patent Application 2011/0296490, owned by the assignee and incorporated by reference herein. As part of the remediation process, the group memberships of a user of an enterprise network are replaced with alternative group memberships, which alternative group memberships provide continuous access to network objects residing on the enterprise network and which the user has historically accessed, while revoking access permissions to other network objects, which were not historically accessed by the user. The remediation process is therefore useful in reducing the number of groups of which a user is a member, thereby reducing the current token size of the user.

Turning now to FIG. 7C, it is shown that excess user authentication token utilization condition predictor 702 preferably includes a user authentication token size calculator 710 operable for calculating a current user authentication token size for each enterprise user in an enterprise computer environment. Excess user authentication token utilization condition predictor 702 preferably also includes an available user authentication token size calculator 712 communicating with user authentication token size calculator 710 and operable for calculating a currently available user authentication token size for each of the enterprise users from the current user authentication token size based on the current user authentication token size, and a maximum group identifier size calculator 724 operable for calculating a maximum group identifier size for multiple user groups in the enterprise computer environment. An excess user authentication token utilization condition calculator 726 is preferably operable, based on the available user authentication token size and the maximum group identifier size, for calculating the number of additional group memberships of each of the enterprise users that can be expected to result in an excess user authentication token utilization condition.

Excess user authentication token utilization condition predictor 702 may also include an alert provider 718 operable for providing an alert with respect to each of the enterprise users before the user reaches an excess user authentication token utilization condition.

Excess user authentication token utilization condition predictor 702 may also include a remediation process initiator 719 operable for initiating a remediation process for each of the enterprise users before the user reaches an excess user authentication token utilization condition. As described hereinabove, a remediation process may be, for example, a remediation process such as described in U.S. Published Patent Application 2011/0296490, owned by the assignee and incorporated by reference herein. As part of the remediation process, the group memberships of a user of an enterprise network are replaced with alternative group memberships, which alternative group memberships provide continuous access to network objects residing on the enterprise network and which the user has historically accessed, while revoking access permissions to other network objects, which were not historically accessed by the user. The remediation process is therefore useful in reducing the number of groups of which a user is a member, thereby reducing the current token size of the user.

Figure 7D:
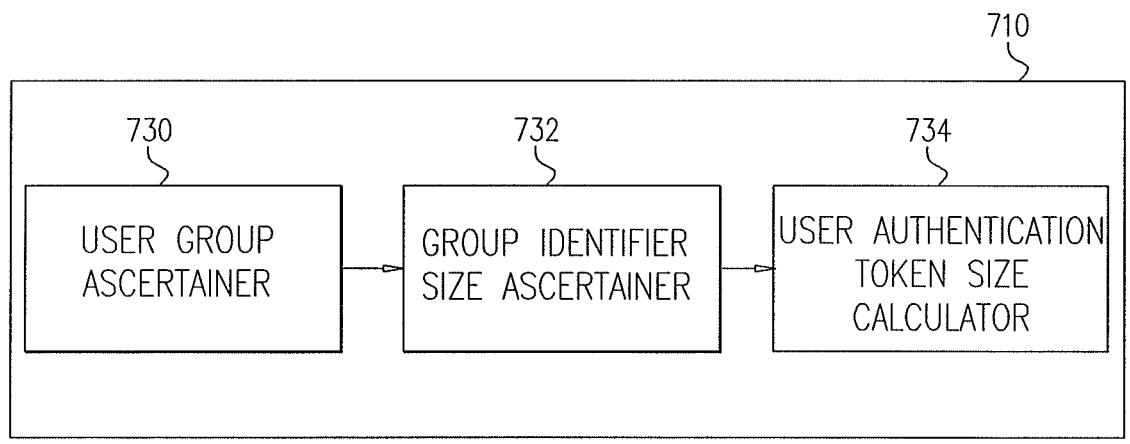
FIG. 7D is a simplified block diagram illustration of a user authentication token size calculator which is part of the systems of FIGS. 7B and 7C.

Reference is now made to FIG. 7D, which is a simplified block diagram illustration of a user authentication token size calculator which is part of the systems of FIGS. 7B and 7C.

As shown in FIG. 7D, user authentication token size calculator 710 of FIGS. 7B and 7C, respectively, preferably includes a user group ascertainer 730 operable for ascertaining for each of a plurality of enterprise users, user groups of which the enterprise user is a member. A group identifier size ascertainer 732, communicating with user group ascertainer 730 is preferably provided for ascertaining the size of a group identifier for each of the user groups of which the enterprise user is a member. A user authentication token size calculator 734 communicating with group identifier size ascertainer 732 is preferably provided for summing the sizes of the group identifiers for each of the user groups of which the enterprise user is a member to arrive at a current user authentication token size for each the enterprise user.

It is appreciated that the user authentication token size calculator of FIG. 7D may be operational for intermittent, periodic or pre-scheduled calculation of user authentication token sizes. Additionally or alternatively, calculation of user authentication token sizes by the user authentication token size calculator of FIG. 7D may be carried out in response to group membership change events.

Figure 7E:
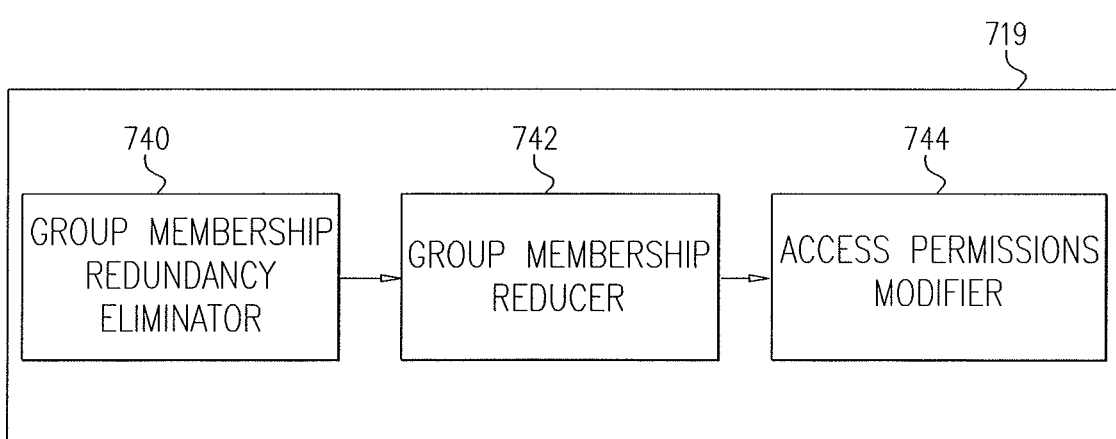
FIG. 7E is a simplified block diagram illustration of a remediation process initiator which is part of the systems of FIGS. 7B and 7C.

Reference is now made to FIG. 7E, which is a simplified block diagram illustration of a remediation process initiator which is part of the systems of FIGS. 7B and 7C.

As shown in FIG. 7E, remediation process initiator 719 of FIGS. 7B and 7C, respectively, preferably includes a group membership redundancy eliminator 740 operable for eliminating group membership redundancy of the enterprise user.

A group membership reducer 742 is preferably operable for at least one of:
  replacing at least a plurality of existing group memberships with a lesser plurality of group memberships;
  replacing at least one existing group membership having a group identifier of a first size with at least one group membership having a group identifier of a second size, smaller than said first size; and
  removing at least one existing group membership from said enterprise user, based on a similarity between said enterprise user and at least one additional user, said similarity being based on a similarity of actual access of said enterprise user and said at least one additional user.

An access permissions modifier 744 is preferably provided for changing access permissions within said enterprise computer environment in order to reduce the number of existing group memberships.

It is appreciated that at least one of the group membership redundancy eliminator, the group membership reducer and the access permissions modifier may configured for automatic operation. Additionally or alternatively, at least one of the group membership redundancy eliminator, the group membership reducer and the access permissions modifier is operable in response to a directive issued by an authorized user, such as an IT Administrator.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for preventing an excess user authentication token utilization condition in an enterprise computer environment, the system comprising a non-transitory medium that stores operatable instructions, the operations comprising:
   an excess user authentication token utilization condition predictor operable for calculating a first number of additional group memberships of each enterprise user that, upon creation, will result in an excess user authentication token utilization condition;
   a group membership estimator operable, for each said enterprise user, for estimating, prior to execution of an anticipated activity that impacts group memberships, a second number of additional group memberships of said enterprise user that will be created by said execution of said anticipated activity; and
   an anticipated excess user authentication token utilization condition preventer operable for ascertaining that said execution of said anticipated activity results in said excess user authentication token utilization condition, and, upon ascertaining that said execution of said anticipated activity will result in said excess user authentication token utilization condition, for modifying said anticipated activity, prior to said execution of said anticipated activity, so as to ensure that said execution of said modified activity will not result in said excess user authentication token utilization condition,
   said anticipated excess user authentication token utilization condition preventer also comprising an alert provider operable in response to said ascertaining that said execution of said anticipated activity will result in said excess user authentication token utilization condition for providing an imminent excess user authentication token utilization alert with respect to each of said enterprise users prior to said execution of said anticipated activity which will result in said excess user authentication token utilization condition.

2. An excess user authentication token utilization condition predictor comprising a non-transitory medium that stores operatable instructions, the operations comprising:
   a user authentication token size calculator operable for calculating a current user authentication token size for each enterprise user in an enterprise computer environment;
   an available user authentication token size calculator operable for calculating a currently available user authentication token size for each of said enterprise users based on said current user authentication token size;
   an average group identifier size calculator operable for calculating an average group identifier size for multiple user groups in said enterprise computer environment; and
   an excess user authentication token utilization condition calculator operable, based on said available user authentication token size and said average group identifier size, for calculating a first number of additional group memberships of each of said enterprise users that, upon creation, will result in an excess user authentication token utilization condition,
   a potential excess condition notification provider operable for providing a notification output when one of said enterprise users requests an activity that will create a second number of additional group memberships that exceed said first number of additional group memberships;
   an alert provider operable for providing, in response to said notification output, an imminent excess user authentication token utilization alert with respect to said one of said enterprise users prior to executing said activity that will create said second number of additional group memberships exceed said first number of additional group memberships; and
   a remediation process initiator operable for initiating a remediation process for said one of said enterprise users, in response to said alert, prior to said executing said activity that will create said second number of additional group memberships that exceed said first number of additional group memberships.

3. A method for preventing an excess user authentication token utilization condition in an enterprise computer environment, the method comprising:
   calculating a number of first additional group memberships of each enterprise user that, upon creation, will result in an excess user authentication token utilization condition;
   for each said enterprise user, estimating, prior to execution of an anticipated activity that impacts group memberships, a second number of additional group memberships of said enterprise user that will be created by said execution of said anticipated activity;
   ascertaining that said execution of said anticipated activity results in said excess user authentication token utilization condition; and
   upon completion of ascertaining execution of said anticipated activity will result in said excess user authentication token utilization condition, providing an imminent excess user authentication token utilization alert with respect to each of said enterprise users prior to said execution of said anticipated activity which will result in said excess user authentication token utilization condition and modifying said anticipated activity, prior to said execution of said anticipated activity, so as to ensure that said execution of said modified activity will not result in said excess user authentication token utilization condition.

4. A method for ascertaining whether an excess user authentication token utilization condition is imminent in an enterprise computer environment, the method comprising:
   calculating a current user authentication token size for each enterprise user in the enterprise computer environment;
   calculating a currently available user authentication token size for each of said enterprise users based on said current user authentication token size;
   calculating an average group identifier size for multiple user groups in said enterprise computer environment;
   based on said available user authentication token size and said average group identifier size, calculating a number of first additional group memberships of each of said enterprise users that, upon creation, will result in an excess user authentication token utilization condition,
   providing a notification output when one of said enterprise users requests an activity that will create a second number of additional group memberships that exceed said first number of additional group memberships;
   providing, in response to said notification output, an imminent excess user authentication token utilization alert with respect to said one of said enterprise users prior to executing said activity that will create said second number of additional group memberships that exceed said first number of additional group memberships;

and automatically initiating a remediation process for said one of said enterprise users prior to said executing said activity that will create said second number of additional group memberships that exceed said first number of additional group memberships.

5. The excess user authentication token utilization condition predictor of claim 2 wherein said remediation process comprises an administrator selectable remediation process.

6. The excess user authentication token utilization condition predictor of claim 5 wherein said administrator selectable remediation process comprises:
    presenting a list of remediation options to said administrator;
    prompting said administrator to select one of said remediation options;
    selecting, by said administrator, one of said remediation options;
    prompting said administrator to confirm said one of said remediation options; and
    upon said administrator confirming said one of said remediation options, executing said one of said remediation options.

7. The excess user authentication token utilization condition predictor of claim 6 wherein said list of remediation options comprises at least one of the following:
    eliminating group membership redundancy of said user;
    replacing a plurality of existing group memberships with a lesser plurality of group memberships;
    replacing an existing group membership having a first group identifier of a first size with a replacement group membership having a second group identifier of a second size, smaller than said first size;
    removing the existing group membership of said user; and
    reducing a number of the existing group memberships by changing access permissions.

8. The excess user authentication token utilization condition predictor of claim 2 wherein said initiating the remediation process comprises automatically selecting a remediation option from a group of remediation options.

9. The method of claim 4 and wherein said remediation process comprises an administrator selectable remediation process.

10. The method of claim 9 wherein said administrator selectable remediation process comprises:
    presenting a list of remediation options to said administrator;
    prompting said administrator to select one of said remediation options;
    selecting, by said administrator, one of said remediation options;
    prompting said administrator to confirm said one of said remediation options; and
    upon said administrator confirming said one of said remediation options, executing said one of said remediation options.

11. The method according to claim 10 wherein said list of remediation options comprises at least one of the following:
    eliminating group membership redundancy of said user;
    replacing a plurality of existing group memberships with a lesser plurality of group memberships;
    replacing an existing group membership having a first group identifier of a first size with a replacement group membership having a second group identifier of a second size, smaller than said first size;
    removing the existing group membership of said user; and
    reducing a number of the existing group memberships by changing access permissions.

12. The method of claim 4 wherein said initiating the remediation process comprises automatically selecting a remediation option from a group of remediation options.

* * * * *